(12) United States Patent
Miyakoshi et al.

(10) Patent No.: US 10,315,485 B2
(45) Date of Patent: Jun. 11, 2019

(54) VEHICLE AIR CONDITIONER DEVICE

(71) Applicant: SANDEN HOLDINGS CORPORATION, Isesaki-shi, Gunma (JP)

(72) Inventors: Ryo Miyakoshi, Isesaki (JP); Kenichi Suzuki, Isesaki (JP); Kouhei Yamashita, Isesaki (JP)

(73) Assignee: Sanden Holdings Corporation, Isesaki-shi, Gunma (JP)

( * ) Notice: Subject to any disclaimer, the term of this patent is extended or adjusted under 35 U.S.C. 154(b) by 101 days.

(21) Appl. No.: 15/512,387

(22) PCT Filed: Sep. 18, 2015

(86) PCT No.: PCT/JP2015/076664
§ 371 (c)(1),
(2) Date: Mar. 17, 2017

(87) PCT Pub. No.: WO2016/043308
PCT Pub. Date: Mar. 24, 2016

(65) Prior Publication Data
US 2017/0274725 A1    Sep. 28, 2017

(30) Foreign Application Priority Data

Sep. 19, 2014   (JP) ................. 2014-191200

(51) Int. Cl.
*B60H 1/00* (2006.01)
*B60H 1/22* (2006.01)
*B60H 1/32* (2006.01)

(52) U.S. Cl.
CPC ..... *B60H 1/00035* (2013.01); *B60H 1/00428* (2013.01); *B60H 1/00642* (2013.01);
(Continued)

(58) Field of Classification Search
CPC ............ B60H 1/00642; B60H 1/00835; B60H 1/00842; B60H 1/00864; B60H 1/00428;
(Continued)

(56) References Cited

U.S. PATENT DOCUMENTS 5,299,431 A * 4/1994 Iritani ................ B60H 1/00021
62/159
5,433,266 A * 7/1995 Doi .................... B60H 1/00821
165/202

(Continued)

FOREIGN PATENT DOCUMENTS

JP    05-319077 A    12/1993
JP    2010-000846 A    1/2010
(Continued)

OTHER PUBLICATIONS

Japan Patent Office, International Search Report issued International Application No. PCT/JP2015/076664, dated Dec. 28, 2015.
(Continued)

*Primary Examiner* — Tho V Duong
(74) *Attorney, Agent, or Firm* — Baker Botts LLP

(57) ABSTRACT

In a vehicle air conditioner device of a heat pump system, control of an air mix damper is appropriately performed in each operation mode, thereby achieving efficient vehicle interior air conditioning. The vehicle air conditioner device includes an air mix damper 28 to adjust a ratio at which air in an air flow passage 3 passed through a heat absorber 9 is to be passed through a radiator 4. In a cooling mode, a controller controls the air mix damper 28 to adjust the ratio at which the air is to be passed through the radiator 4 on the basis of one, any combination, or all of a target outlet temperature, a temperature of the radiator and a temperature of the heat absorber, and in a heating mode, the controller
(Continued)

controls the air mix damper 28 to pass all the air in the air flow passage 3 through the radiator 4.

3 Claims, 10 Drawing Sheets

(52) U.S. Cl.
CPC ..... B60H 1/00785 (2013.01); B60H 1/00835 (2013.01); B60H 1/00921 (2013.01); B60H 1/2215 (2013.01); B60H 1/3207 (2013.01); B60H 2001/0015 (2013.01); B60H 2001/00114 (2013.01); B60H 2001/00121 (2013.01); B60H 2001/00128 (2013.01); B60H 2001/00957 (2013.01)

(58) Field of Classification Search
CPC .............. B60H 1/00035; B60H 1/0064; B60H 1/00785; B60H 1/00921; B60H 1/2215; B60H 1/3207; B60H 1/00064
See application file for complete search history.

(56) References Cited

U.S. PATENT DOCUMENTS

| | | | | |
|---|---|---|---|---|
| 5,518,065 A | * | 5/1996 | Asou | B60H 1/00814 165/43 |
| 5,605,051 A | * | 2/1997 | Iritani | B60H 1/3211 62/160 |
| 5,971,845 A | * | 10/1999 | Echigoya | B60H 1/00735 454/121 |
| 6,076,593 A | * | 6/2000 | Takagi | B60H 1/00914 165/201 |
| 9,188,350 B2 | * | 11/2015 | Choi | B60H 1/00 |
| 2011/0167850 A1 | * | 7/2011 | Itoh | B60H 1/00914 62/160 |

FOREIGN PATENT DOCUMENTS

| | | |
|---|---|---|
| JP | 2010-070082 A | 4/2010 |
| JP | 2011-031725 A | 2/2011 |
| JP | 2012-176659 A | 9/2012 |
| JP | 2012-250708 A | 12/2012 |
| JP | 2013-220715 A | 10/2013 |
| JP | 2014-094674 A | 5/2014 |

OTHER PUBLICATIONS

Japan Patent Office, Notification of Reasons for Refusal issued in Japanese Patent Application No. 2014-191200, dated Oct. 16, 2018.

\* cited by examiner

FIG. 10

| OPERATION MODE | TCO DETERMINING METHOD | | SW CALCULATION VALUE LIMITING METHOD | |
|---|---|---|---|---|
| | | | OTHER THAN Auto B/L | Auto B/L |
| HEATING | EMPLOY TCO BASED ON TAO ON HIGHER SIDE IN Dr and As | TAODr ==TAOAs | SWDr=1 | SWDr=SW2~SW3 |
| | | | SWAs=1 | SWAs=SW2~SW3 |
| DEHUMIDIFYING HEATING | TCO=MAX(TAODr, TAOAs) *ADDITIONALLY, FIX TO TCO UPPER LIMIT VALUE IN Auto B/L MODE | TAODr > TAOAs | SWDr=1 LOWER LIMIT VALUE ≤ SWAs= ≤ 1 | SWDr=SW3~SW4 |
| | | | | SWAs=SW1~SW2 |
| | | TAODr < TAOAs | SWAs=1 LOWER LIMIT VALUE ≤ SWDr= ≤ 1 | SWDr=SW1~SW2 |
| | | | | SWAs=SW3~SW4 |
| DEHUMIDIFYING COOLING | EMPLOY TCO BASED ON TAO ON HIGHER SIDE IN Dr and As | TAODr ==TAOAs | 0 ≤ SWDr/SWAs ≤ 1 | SWDr=SW2~SW3 |
| | | | | SWAs=SW2~SW3 |
| COOLING | TCO=MAX(TAODr, TAOAs) *ADDITIONALLY, FIX TO TCO UPPER LIMIT VALUE IN Auto B/L MODE | TAODr > TAOAs | | SWDr=SW3~SW4 |
| | | | | SWAs=SW1~SW2 |
| | | TAODr < TAOAs | | SWDr=SW1~SW2 |
| | | | | SWAs=SW3~SW4 |

VEHICLE AIR CONDITIONER DEVICE

CROSS-REFERENCE TO RELATED APPLICATIONS

This application is a U.S. National Stage Patent Application under 37 U.S.C. § 371 of International Patent Application No. PCT/JP2015/076664, filed on Sep. 18, 2015, which claims the benefit of Japanese Patent Application No. JP 2014-191200, filed on Sep. 19, 2014, the disclosures of each of which are incorporated herein by reference in their entirety.

TECHNICAL FIELD

The present invention relates to an air conditioner device of a heat pump system which conditions air in a vehicle interior.

BACKGROUND ART

Due to actualization of environmental problems in recent years, hybrid cars and electric cars have spread. Further, as an air conditioner device which is applicable to such a vehicle, there has been developed an air conditioner device which includes an electric compressor to compress and discharge a refrigerant, a radiator (a condenser) disposed in an air flow passage to let the refrigerant radiate heat, a heat absorber (an evaporator) disposed in the air flow passage to let the refrigerant absorb heat, and an outdoor heat exchanger disposed outside a vehicle interior to let the refrigerant radiate or absorb heat, and which changes and executes respective operation modes of a heating mode to let the refrigerant discharged from the compressor radiate heat in the radiator and let the refrigerant by which heat has been radiated in this radiator absorb heat in the outdoor heat exchanger, a dehumidifying and heating mode to let the refrigerant discharged from the compressor radiate heat in the radiator and let the refrigerant by which heat has been radiated absorb heat in the heat absorber and the outdoor heat exchanger, a dehumidifying and cooling mode to let the refrigerant discharged from the compressor radiate heat in the radiator and the outdoor heat exchanger and let the refrigerant by which heat has been radiated absorb heat in the heat absorber, a cooling mode to let the refrigerant discharged from the compressor radiate heat in the outdoor heat exchanger and let the refrigerant absorb heat in the heat absorber, and the like.

Furthermore, there is provided an air mix damper in the air flow passage, and with this air mix damper, a ratio at which air is to be passed through the radiator is adjusted in an entire range from zero, thereby achieving a target outlet temperature to the vehicle interior (e.g., see Patent Document 1).

To control the air mix damper in this case, as a parameter, an air volume ratio SW at which the air is to be passed through the radiator is used, and the ratio is obtained by a calculating equation of $SW=(TAO-Te)/(TH-Te)$, in which TAO is a target outlet temperature, TH is a temperature of a radiator 4, and Te is a temperature of the heat absorber. In all operation modes, the air volume ratio SW changes in a range of $0 \leq SW \leq 1$ in which 0 indicates an air mix shut off state where the air is not passed through the radiator, and 1 is an air mix fully open state to pass all the air in the air flow passage through the radiator.

CITATION LIST

Patent Documents

Patent Document 1: Japanese Patent Application Publication No. 2012-250708

SUMMARY OF THE INVENTION

Problems to be Solved by the Invention

Such control of an air mix damper as described above is not limited to a hybrid car or an electric car, and is usually performed in a usual engine drive type car. In this engine drive type car, air blown out to a vehicle interior is heated with a heater core in which engine waste heat is utilized, but in a vehicle air conditioner device of a heat pump system, air is heated with the above-mentioned radiator, and hence it is necessary to control a temperature TH of this radiator in accordance with a target outlet temperature TAO.

However, when the air mix damper is controlled in accordance with such a calculating equation of an air volume ratio SW as described above and a volume of the air to be passed through the radiator decreases, loss of a heating capability is caused. Furthermore, when the volume of the air to be passed through the radiator is excessively decreased by the air mix damper (SW comes close to 0), there is also the problem that a heat pump cycle breaks.

On the other hand, in a vehicle in which target outlet temperatures are settable at a driver's seat and an assistant driver's seat independently of each other (right/left independent control), it is also a problem how to and whether or not to set the temperature of the radiator, and the problem has been required to be solved.

The present invention has been developed to solve such a conventional technical problem, and in a vehicle air conditioner device of a so-called heat pump system, it is an object to appropriately control an air mix damper in each operation mode, thereby achieving efficient vehicle interior air conditioning.

Means for Solving the Problems

A vehicle air conditioner device of an embodiment includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, an air mix damper to adjust a ratio at which the air in the air flow passage passed through the heat absorber is to be passed through the radiator, and control means, the vehicle air conditioner device changes and executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and a cooling mode in which the control means lets the refrigerant discharged from the compressor radiate heat in the outdoor heat exchanger, decompresses the refrigerant by which heat has been radiated, and then lets the refrigerant absorb heat in the heat absorber, and the vehicle air conditioner device is characterized in that in the cooling mode, the control means controls the air mix damper to adjust the ratio at which the air is to be passed through the radiator on the basis of one, any combination, or all of a target outlet temperature, a temperature of the radiator and a temperature of the heat absorber, and in the heating mode, the control means controls the air mix damper to pass all the air in the air flow passage through the radiator.

According to the vehicle air conditioner device of an embodiment, the vehicle air conditioner device of the above invention executes a dehumidifying and heating mode in which the control means lets the refrigerant discharged from the compressor radiate heat in the radiator, decompresses the refrigerant by which heat has been radiated, and then lets the refrigerant absorb heat in the heat absorber and the outdoor heat exchanger, and the vehicle air conditioner device is characterized in that also in this dehumidifying and heating mode, the control means controls the air mix damper to pass all the air in the air flow passage through the radiator.

A vehicle air conditioner device of an embodiment includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, an air mix damper to adjust a ratio at which the air in the air flow passage passed through the heat absorber is to be passed through the radiator, and control means, the vehicle air conditioner device changes and executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and a cooling mode in which the control means lets the refrigerant discharged from the compressor radiate heat in the outdoor heat exchanger, decompresses the refrigerant by which heat has been radiated, and then lets the refrigerant absorb heat in the heat absorber, and the vehicle air conditioner device is characterized in that in each operation mode, the control means controls the air mix damper to adjust the ratio at which the air is to be passed through the radiator on the basis of one, any combination, or all of a target outlet temperature, a temperature of the radiator and a temperature of the heat absorber, and in the heating mode, the control means regulates the ratio at which the air in the air flow passage is to be passed through the radiator into a predetermined lower limit value or more.

According to the vehicle air conditioner device of an embodiment, the vehicle air conditioner device in the above invention executes a dehumidifying and heating mode in which the control means lets the refrigerant discharged from the compressor radiate heat in the radiator, decompresses the refrigerant by which heat has been radiated, and then lets the refrigerant absorb heat in the heat absorber and the outdoor heat exchanger, and the vehicle air conditioner device is characterized in that also in this dehumidifying and heating mode, the control means regulates the ratio at which the air in the air flow passage is to be passed through the radiator into a predetermined lower limit value or more.

The vehicle air conditioner device of an embodiment is characterized in that in the above respective inventions, the control means has a B/L blowout mode to blow out air from both a vent and a foot to the vehicle interior, and in this B/L blowout mode, the control means regulates the ratio at which the air in the air flow passage is to be passed through the radiator in a predetermined intermediate range.

A vehicle air conditioner device of an embodiment includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, an air mix damper to adjust a ratio at which the air in the air flow passage passed through the heat absorber is to be passed through the radiator, and control means, the vehicle air conditioner device changes and executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and a cooling mode in which the control means lets the refrigerant discharged from the compressor radiate heat in the outdoor heat exchanger, decompresses the refrigerant by which heat has been radiated, and then lets the refrigerant absorb heat in the heat absorber, and the vehicle air conditioner device is characterized in that the air mix dampers are disposed to a driver's seat and an assistant driver's seat, respectively, the control means is settable target outlet temperatures at the driver's seat and the assistant driver's seat, respectively, and adjusts a radiator target temperature of the radiator into the higher target outlet temperature in the target outlet temperatures at the driver's seat and the assistant driver's seat, and in the cooling mode, the control means controls the air mix dampers to adjust the ratio at which the air is to be passed through the radiator on the basis of one, any combination, or all of a target outlet temperature, a temperature of the radiator and a temperature of the heat absorber, and in the heating mode, the control means controls the air mix damper having the higher target outlet temperature in the air mix dampers at the driver's seat and the assistant driver's seat to pass all the air in the air flow passage through the radiator, and the control means controls the air mix damper having the lower target outlet temperature to adjust the ratio at which the air is to be passed through the radiator and to regulate the ratio into a predetermined lower limit value or more, on the basis of one, any combination, or all of the target outlet temperature, the temperature of the radiator and the temperature of the heat absorber.

According to the vehicle air conditioner device of an embodiment, the vehicle air conditioner device of the above invention executes a dehumidifying and heating mode in which the control means lets the refrigerant discharged from the compressor radiate heat in the radiator, decompresses the refrigerant by which heat has been radiated, and then lets the refrigerant absorb heat in the heat absorber and the outdoor heat exchanger, and the vehicle air conditioner device is characterized in that also in this dehumidifying and heating mode, the control means controls the air mix damper having the higher target outlet temperature in the air mix dampers at the driver's seat and the assistant driver's seat to pass all the air in the air flow passage through the radiator, and the control means controls the air mix damper having the lower target outlet temperature to adjust the ratio at which the air is to be passed through the radiator and to regulate the ratio into a predetermined lower limit value or more, on the basis of one, any combination, or all of the target outlet temperature, the temperature of the radiator and the temperature of the heat absorber.

The vehicle air conditioner device of an embodiment is characterized in that the control means has a B/L blowout mode to blow out air from both a vent and a foot to the vehicle interior, and in this B/L blowout mode, the control means controls the air mix damper having the higher target outlet temperature to regulate the ratio at which the air in the air flow passage is to be passed through the radiator in a predetermined first intermediate range, and the control means controls the air mix damper having the lower target outlet temperature to regulate the ratio at which the air in the air flow passage is to be passed through the radiator in a predetermined second intermediate range smaller than the first intermediate range.

According to the vehicle air conditioner device of an embodiment, the vehicle air conditioner device in each of the above respective inventions executes a dehumidifying and cooling mode in which the control means lets the refrigerant discharged from the compressor radiate heat in the radiator and the outdoor heat exchanger, decompresses the refrigerant by which heat has been radiated, and then lets the refrigerant absorb heat in the heat absorber, and the vehicle air conditioner device is characterized in that also in this dehumidifying and cooling mode, the control means controls the air mix damper having the lower target outlet temperature to adjust the ratio at which the air is to be passed through the radiator on the basis of one, any combination, or all of the target outlet temperature, the temperature of the radiator and the temperature of the heat absorber.

Advantageous Effect of the Invention

When a heating capability of a radiator is the same, a power of a compressor in a heating mode is decreased to save energy more in a case of passing all air in an air flow passage through the radiator than in a case of decreasing an air volume ratio.

In an embodiment, a vehicle air conditioner device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, an air mix damper to adjust a ratio at which the air in the air flow passage passed through the heat absorber is to be passed through the radiator, and control means, the vehicle air conditioner device changes and executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and a cooling mode in which the control means lets the refrigerant discharged from the compressor radiate heat in the outdoor heat exchanger, decompresses the refrigerant by which heat has been radiated, and then lets the refrigerant absorb heat in the heat absorber, and the vehicle air conditioner device is characterized in that in the cooling mode, the control means controls the air mix damper to adjust the ratio at which the air is to be passed through the radiator on the basis of one, any combination, or all of a target outlet temperature, a temperature of the radiator and a temperature of the heat absorber, and in the heating mode, the control means controls the air mix damper to pass all the air in the air flow passage through the radiator. Therefore, it is possible to achieve efficient vehicle interior heating in the heating mode. Furthermore, a heat pump cycle does not break, and a stable heating operation can be achieved.

Furthermore, when also in a dehumidifying and heating mode, the control means similarly controls the air mix damper to pass all the air in the air flow passage through the radiator as in an embodiment, it is possible to achieve stable and efficient vehicle interior dehumidifying and heating also in this dehumidifying and heating mode.

Furthermore, in a case of passing more air in the air flow passage through the radiator, a discharge pressure of the compressor in the heating mode becomes lower than in a case of decreasing an air volume ratio.

In an embodiment, a vehicle air conditioner device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, an air mix damper to adjust a ratio at which the air in the air flow passage passed through the heat absorber is to be passed through the radiator, and control means, the vehicle air conditioner device changes and executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and a cooling mode in which the control means lets the refrigerant discharged from the compressor radiate heat in the outdoor heat exchanger, decompresses the refrigerant by which heat has been radiated, and then lets the refrigerant absorb heat in the heat absorber, and the vehicle air conditioner device is characterized in that in each operation mode, the control means controls the air mix damper to adjust the ratio at which the air is to be passed through the radiator on the basis of one, any combination, or all of a target outlet temperature, a temperature of the radiator and a temperature of the heat absorber, and in the heating mode, the control means regulates the ratio at which the air in the air flow passage is to be passed through the radiator into a predetermined lower limit value or more. Therefore, it is possible to inhibit increase of the discharge pressure of the compressor in the heating mode and to achieve improvement of a durability. Furthermore, the heat pump cycle does not break, and a stable heating operation can be achieved.

Furthermore, when also in the dehumidifying and heating mode, the control means similarly controls the air mix damper to regulate the ratio at which the air in the air flow passage is to be passed through the radiator into a predetermined lower limit value or more as in an embodiment, it is possible to achieve the improvement of the durability and achieve the stable vehicle interior dehumidifying and heating also in this dehumidifying and heating mode.

Here, when the control means has a B/L blowout mode to blow out air from both a vent and a foot to the vehicle interior, the control means regulates the ratio at which the air in the air flow passage is to be passed through the radiator in a predetermined intermediate range as in an embodiment. Consequently, it is possible to make a sufficient difference between an outlet temperature of the vent and an outlet temperature of the foot, and it is possible to secure comfort.

According to an embodiment, a vehicle air conditioner device includes a compressor which compresses a refrigerant, an air flow passage through which air to be supplied to a vehicle interior flows, a radiator which lets the refrigerant radiate heat to heat the air to be supplied from the air flow passage to the vehicle interior, a heat absorber which lets the refrigerant absorb heat to cool the air to be supplied from the air flow passage to the vehicle interior, an outdoor heat exchanger disposed outside the vehicle interior to let the refrigerant radiate or absorb heat, an air mix damper to adjust a ratio at which the air in the air flow passage passed through the heat absorber is to be passed through the radiator, and control means, the vehicle air conditioner device changes and executes at least a heating mode in which the control means lets the refrigerant discharged from the compressor radiate heat in the radiator, decompresses the refrigerant by which heat has been radiated, and then lets the refrigerant absorb heat in the outdoor heat exchanger, and a cooling mode in which the control means lets the refrigerant discharged from the compressor radiate heat in the outdoor heat exchanger, decompresses the refrigerant by which heat has been radiated, and then lets the refrigerant absorb heat in the heat absorber, and the vehicle air conditioner device is characterized in that air mix dampers are disposed to a driver's seat and an assistant driver's seat, respectively, the control means is settable target outlet temperatures at the driver's seat and the assistant driver's seat, respectively, and adjusts a radiator target temperature of the radiator into the higher target outlet temperature in the target outlet temperatures at the driver's seat and the assistant driver's seat, and in the cooling mode, the control means controls the air mix dampers to adjust the ratio at which the air is to be passed through the radiator on the basis of one, any combination, or all of a target outlet temperature, a temperature of the radiator and a temperature of the heat absorber, and in the heating mode, the control means controls the air mix damper having the higher target outlet temperature in the air mix dampers at the driver's seat and the assistant driver's seat to pass all the air in the air flow passage through the radiator, and the control means controls the air mix damper having the lower target outlet temperature to adjust the ratio at which the air is to be passed through the radiator and to regulate the ratio into a predetermined lower limit value or more, on the basis of one, any combination, or all of the target outlet temperature, the temperature of the radiator and the temperature of the heat absorber. Consequently, it is possible to inhibit the increase of the discharge pressure of the compressor and achieve the improvement of the durability at the lower target outlet temperature, while achieving the efficient vehicle interior heating at the higher target outlet temperature in the heating mode. Furthermore, in the same manner as in the above-mentioned invention, the heat pump cycle does not break, and the stable heating operation can be achieved.

Furthermore, when similarly controlling the air mix dampers at the driver's seat and the assistant driver's seat also in the dehumidifying and heating mode as in an embodiment, it is possible to inhibit the increase of the discharge pressure of the compressor and achieve the improvement of the durability at the lower target outlet temperature, while achieving the efficient vehicle interior heating at the higher target outlet temperature in this dehumidifying and heating mode.

Here, when the control means has a B/L blowout mode to blow out air from both a vent and a foot to the vehicle interior, as in an embodiment, in the B/L blowout mode, the control means controls the air mix damper having the higher target outlet temperature to regulate the ratio at which the air in the air flow passage is to be passed through the radiator in a predetermined first intermediate range, and the control means controls the air mix damper having the lower target outlet temperature to regulate the ratio at which the air in the air flow passage is to be passed through the radiator in a predetermined second intermediate range smaller than the first intermediate range. Consequently, it is possible to make an appropriate difference between an outlet temperature of the vent and an outlet temperature of the foot, and it is possible to secure comfort, at each of the driver's seat and the assistant driver's seat.

Furthermore, as in an embodiment, also in the dehumidifying and cooling mode, the control means controls the air mix damper to adjust the ratio at which the air is to be passed through the radiator on the basis of one, any combination, or all of the target outlet temperature, the temperature of the radiator and the temperature of the heat absorber, in the same manner as in the cooling mode. Consequently, it is possible to achieve comfortable vehicle interior air conditioning also in the dehumidifying and cooling mode, in the same manner as in a conventional technology.

BRIEF DESCRIPTION OF THE DRAWINGS

FIG. 10 is an explanatory view of control of an air mix damper of the vehicle air conditioner device of FIG. 1 in a case where target outlet temperatures are separately settable at a driver's seat and an assistant driver's seat (Embodiment 4).

MODE FOR CARRYING OUT THE INVENTION

Hereinafter, embodiments of the present invention will be described in detail with reference to the drawings.

Embodiment 1

Figure 1:
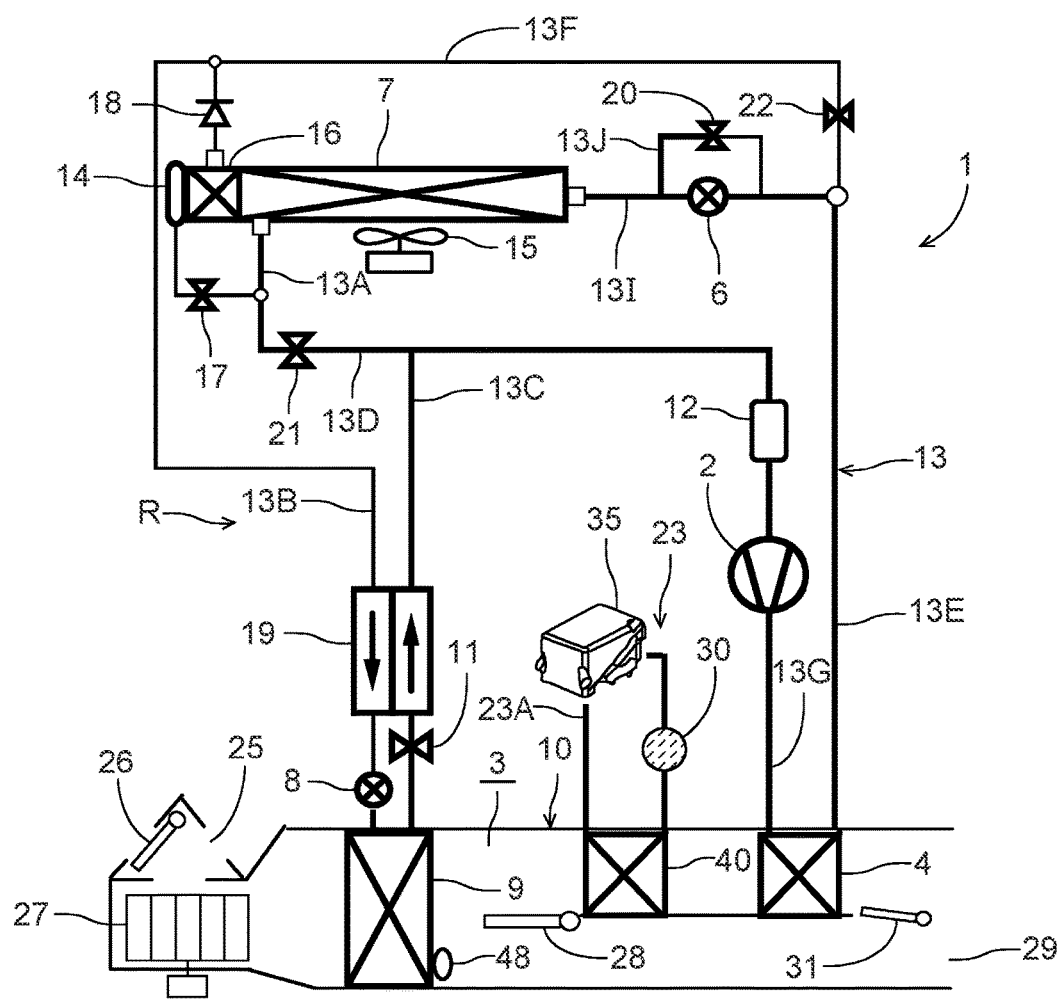
FIG. 1 is a constitutional view of a vehicle air conditioner device of one embodiment to which the present invention is applied.

FIG. 1 shows a constitutional view of a vehicle air conditioner device 1 of one embodiment of the present invention. A vehicle of the embodiment to which the present invention is applied is an electric car (EV) in which an engine (an internal combustion engine) is not mounted and which runs by driving an electric motor for running with power charged in a battery (which is not shown in the drawing), and the vehicle air conditioner device 1 of the present invention is also driven with the power of the battery. That is, the vehicle air conditioner device 1 of the embodiment performs heating by a heat pump operation using a refrigerant circuit in the electric car in which it is not possible to perform heating by engine waste heat, and further, the vehicle air conditioner device selectively executes respective operation modes of dehumidifying and heating, an internal cycle, dehumidifying and cooling, and cooling.

It is to be noted that the vehicle is not limited to the electric car, and the present invention is also effective for a so-called hybrid car using the engine together with the electric motor for running, and furthermore, needless to say, the present invention is also applicable to a usual car which runs with the engine.

The vehicle air conditioner device 1 of the embodiment performs air conditioning (heating, cooling, dehumidifying, and ventilation) of a vehicle interior of the electric car, and there are successively connected, by a refrigerant pipe 13, an electric type of compressor 2 which compresses a refrigerant, a radiator 4 disposed in an air flow passage 3 of an HVAC unit 10 in which vehicle interior air passes and circulates, to let the high-temperature high-pressure refrigerant discharged from the compressor 2 flow inside via a refrigerant pipe 13G and to let this refrigerant radiate heat in the vehicle interior, an outdoor expansion valve 6 constituted of an electric valve which decompresses and expands the refrigerant during the heating, an outdoor heat exchanger 7 which performs heat exchange between the refrigerant and outdoor air to function as the radiator during the cooling and to function as an evaporator during the heating, an indoor expansion valve 8 constituted of an electric valve which decompresses and expands the refrigerant, a heat absorber 9 disposed in the air flow passage 3 to let the refrigerant absorb heat from interior and exterior of the vehicle during the cooling and during the dehumidifying, an evaporation capability control valve 11 which adjusts an evaporation capability in the heat absorber 9, an accumulator 12 and the like, thereby constituting a refrigerant circuit R.

It is to be noted that in the outdoor heat exchanger 7, an outdoor blower 15 is disposed. The outdoor blower 15 is constituted to forcibly blow the outdoor air through the outdoor heat exchanger 7, thereby performing heat exchange between the outdoor air and the refrigerant, and consequently, the outdoor blower blows the outdoor air through the outdoor heat exchanger 7 also during stop (i.e., a velocity is 0 km/h).

Furthermore, the outdoor heat exchanger 7 has a receiver drier portion 14 and a subcooling portion 16 successively on a refrigerant downstream side, a refrigerant pipe 13A extending out from the outdoor heat exchanger 7 is connected to the receiver drier portion 14 via a solenoid valve 17 opened during the cooling, and an outlet of the subcooling portion 16 is connected to the indoor expansion valve 8 via a check valve 18. It is to be noted that the receiver drier portion 14 and the subcooling portion 16 structurally constitute a part of the outdoor heat exchanger 7, and an indoor expansion valve 8 side of the check valve 18 is a forward direction.

Furthermore, a refrigerant pipe 13B between the check valve 18 and the indoor expansion valve 8 is disposed in a heat exchange relation with a refrigerant pipe 13C extending out from the evaporation capability control valve 11 positioned on an outlet side of the heat absorber 9, and both the pipes constitute an internal heat exchanger 19. In consequence, the refrigerant flowing into the indoor expansion valve 8 through the refrigerant pipe 13B is cooled (subcooled) by the low-temperature refrigerant flowing out from the heat absorber 9 through the evaporation capability control valve 11.

Furthermore, the refrigerant pipe 13A extending out from the outdoor heat exchanger 7 branches, and this branching refrigerant pipe 13D communicates and connects with the refrigerant pipe 13C on a downstream side of the internal heat exchanger 19 via a solenoid valve 21 to be opened during the heating. The refrigerant pipe 13C is connected to the accumulator 12 and the accumulator 12 is connected to a refrigerant suction side of the compressor 2. That is, the solenoid valve 21 for heating is interposed between an outlet of the outdoor heat exchanger 7 (in a heating or dehumidifying and heating mode) and an inlet of the accumulator 12.

Furthermore, a refrigerant pipe 13E on an outlet side of the radiator 4 branches before the outdoor expansion valve 6, and this branching refrigerant pipe 13F communicates and connects with the refrigerant pipe 13B on a downstream side of the check valve 18 via a solenoid valve 22 to be opened during the dehumidifying. That is, the solenoid valve 22 for dehumidifying is connected in parallel with the outdoor heat exchanger 7 (and the outdoor expansion valve 6, etc.).

Furthermore, the outdoor expansion valve 6 is connected in parallel with a bypass pipe 13J, and in the bypass pipe 13J, a solenoid valve 20 is interposed to open in a cooling mode so that the refrigerant bypasses the outdoor expansion valve 6 to flow. It is to be noted that a pipe between the outdoor expansion valve 6 and the solenoid valve 20 and the outdoor heat exchanger 7 is denoted with 13I.

Furthermore, in the air flow passage 3 on an air upstream side of the heat absorber 9, respective suction ports such as an outdoor air suction port and an indoor air suction port are formed (represented by a suction port 25 in FIG. 1), and in the suction port 25, a suction changing damper 26 is disposed to change the air to be introduced into the air flow passage 3 to indoor air which is air in the vehicle interior (an indoor air circulating mode) and outdoor air which is air outside the vehicle interior (an outdoor air introducing mode). Furthermore, on an air downstream side of the suction changing damper 26, an indoor blower (a blower fan) 27 is disposed to supply the introduced indoor air or outdoor air to the air flow passage 3.

Furthermore, in FIG. 1, reference numeral 23 indicates a heating medium circulating circuit disposed in the vehicle air conditioner device 1 of the embodiment. The heating medium circulating circuit 23 includes a circulating pump 30 constituting circulating means, a heating medium heating electric heater 35, and a heating medium-air heat exchanger 40 (auxiliary heating means) disposed in the air flow passage 3 on an air upstream side of the radiator 4 to the flow of the air of the air flow passage 3, and these components are successively annularly connected to one another by a heating medium pipe 23A. It is to be noted that as the heating medium to circulate in the heating medium circulating circuit 23, for example, water, a refrigerant such as HFO-1234yf, a coolant or the like is employed.

Further, when the circulating pump 30 is operated and the heating medium heating electric heater 35 is energized to generate heat, the heating medium heated by the heating medium heating electric heater 35 circulates through the heating medium-air heat exchanger 40. That is, the heating medium-air heat exchanger 40 of the heating medium circulating circuit 23 becomes a so-called heater core, and complements the heating of the vehicle interior. The employing of the heating medium circulating circuit 23 can improve electric safety of a passenger.

Furthermore, in the air flow passage 3 on the air upstream side of the heating medium-air heat exchanger 40, an air mix damper 28 is disposed to adjust a ratio at which air (indoor air or outdoor air) in the air flow passage 3 passing through the heat absorber 9 after flowing into the air flow passage 3 is to be passed through the radiator 4. Furthermore, in the air flow passage 3 on the air downstream side of the radiator 4, there is formed each outlet (represented by an outlet 29 in FIG. 1) of foot, vent or defroster, and in the outlet 29, an outlet changing damper 31 is disposed to execute changing control of blowing of the air from each outlet mentioned above.

Figure 2:
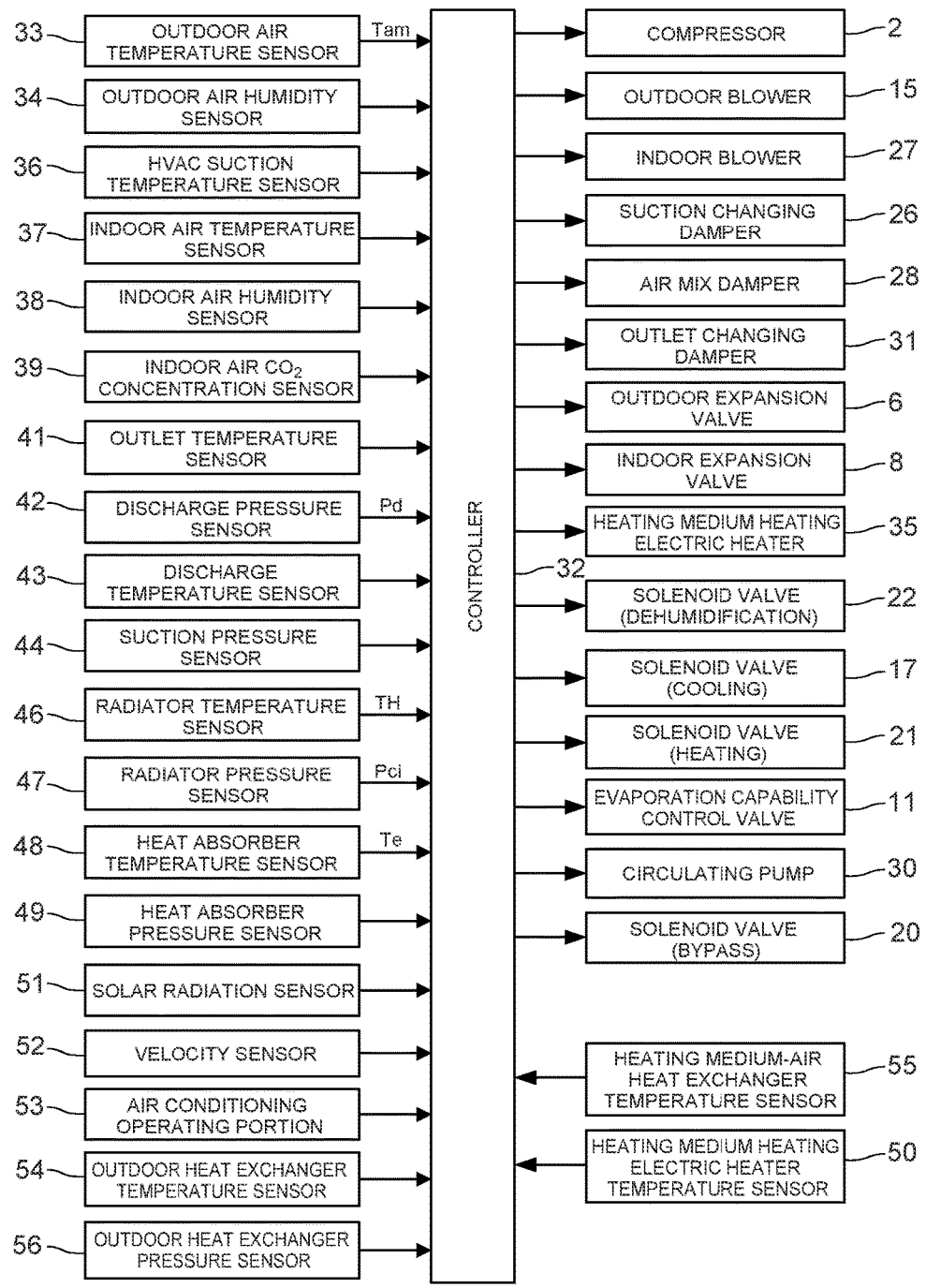
FIG. 2 is a block diagram of an electric circuit of a controller of the vehicle air conditioner device of FIG. 1.

Next, in FIG. 2, 32 is a controller (ECU) as control means constituted of a microcomputer, and an input of the controller 32 is connected to respective outputs of an outdoor air temperature sensor 33 which detects an outdoor air temperature (Tam) of the vehicle, an outdoor air humidity sensor 34 which detects an outdoor air humidity, an HVAC suction temperature sensor 36 which detects a temperature of the air to be sucked from the suction port 25 to the air flow passage 3, an indoor air temperature sensor 37 which detects a temperature of the air of the vehicle interior (the indoor air), an indoor air humidity sensor 38 which detects a humidity of the air of the vehicle interior, an indoor air $CO_2$ concentration sensor 39 which detects a carbon dioxide concentration of the vehicle interior, an outlet temperature sensor 41 which detects a temperature (an outlet temperature TA) of the air blown out from the outlet 29 to the vehicle interior, a discharge pressure sensor 42 which detects a pressure (a discharge pressure Pd) of the refrigerant discharged from the compressor 2, a discharge temperature sensor 43 which detects a temperature (a discharge temperature Td) of the refrigerant discharged from the compressor 2, a suction pressure sensor 44 which detects a suction refrigerant pressure of the compressor 2, a radiator temperature sensor 46 which detects a temperature of the radiator 4 (the temperature of the air passed through the radiator 4 or the temperature of the radiator 4 itself: a radiator temperature TH), a radiator pressure sensor 47 which detects a refrigerant pressure of the radiator 4 (the pressure in the radiator 4 or of the refrigerant which has just flowed out from the radiator 4: a radiator pressure Pci), a heat absorber temperature sensor 48 which detects a temperature of the heat absorber 9 (the temperature of the air passed through the heat absorber 9 or the temperature of the heat absorber 9 itself: a heat absorber temperature Te), a heat absorber pressure sensor 49 which detects a refrigerant pressure of the heat absorber 9 (the pressure in the heat absorber 9 or of the refrigerant which has just flowed out from the heat absorber 9), a solar radiation sensor 51 of, e.g., a photo sensor system to detect a solar radiation amount into the vehicle, a velocity sensor 52 to detect a moving speed (a velocity) of the vehicle, an air conditioning operating portion 53 to set the changing of a predetermined temperature or the operation mode, an outdoor heat exchanger temperature sensor 54 which detects a temperature of the outdoor heat exchanger 7 (the temperature of the refrigerant which has just flowed out from the outdoor heat exchanger 7 or the temperature of the outdoor heat exchanger 7 itself), and an outdoor heat exchanger pressure sensor 56 which detects the refrigerant pressure of the outdoor heat exchanger 7 (the pressure in the outdoor heat exchanger 7 or of the refrigerant which has just flowed out from the outdoor heat exchanger 7).

Furthermore, the input of the controller 32 is further connected to respective outputs of a heating medium heating electric heater temperature sensor 50 which detects a temperature of the heating medium heating electric heater 35 of the heating medium circulating circuit 23 (the temperature of the heating medium which has just been heated by the heating medium heating electric heater 35, or the temperature of an unshown electric heater itself disposed in the heating medium heating electric heater 35), and a heating medium-air heat exchanger temperature sensor 55 which detects a temperature of the heating medium-air heat exchanger 40 (the temperature of the air flowing through the heating medium-air heat exchanger 40, or the temperature of the heating medium-air heat exchanger 40 itself).

On the other hand, an output of the controller 32 is connected to the compressor 2, the outdoor blower 15, the indoor blower (the blower fan) 27, the suction changing damper 26, the air mix damper 28, the outlet changing damper 31, the outdoor expansion valve 6, the indoor expansion valve 8, respective solenoid valves such as the solenoid valve 22 (dehumidifying), the solenoid valve 17 (cooling), the solenoid valve 21 (heating) and the solenoid valve 20 (bypass), the circulating pump 30, the heating medium heating electric heater 35, and the evaporation capability control valve 11. Further, the controller 32 controls these components on the basis of the outputs of the respective sensors and the setting input by the air conditioning operating portion 53.

Next, an operation of the vehicle air conditioner device 1 of the embodiment having the above-mentioned constitution will be described. The controller 32 changes and executes respective operation modes such as a heating mode, a dehumidifying and heating mode, an internal cycle mode, a dehumidifying and cooling mode, and a cooling mode. First, a flow of the refrigerant in each operation mode will be described. Furthermore, control of the air mix damper 28 will be described later in detail.

(1) Flow of Refrigerant of Heating Mode

When the heating mode is selected by the controller 32 (an auto mode) or a manual operation to the air conditioning operating portion 53 (a manual mode), the controller 32 opens the solenoid valve 21 (for the heating) and closes the solenoid valve 17. Then, the controller closes the solenoid valve 22 and closes the solenoid valve 20.

Further, the controller operates the compressor 2 and the respective blowers 15 and 27, and the air mix damper 28 has a state of passing the air blown out from the indoor blower 27 through the heating medium-air heat exchanger 40 and the radiator 4 as described later. In consequence, a high-temperature high-pressure gas refrigerant discharged from the compressor 2 flows into the radiator 4. The air in the air flow passage 3 passes through the radiator 4, and hence the air in the air flow passage 3 is heated by the high-temperature refrigerant in the radiator 4 (by the heating medium-air heat exchanger 40 and the radiator 4 when the heating medium circulating circuit 23 operates), whereas the refrigerant in the radiator 4 has the heat taken by the air and is cooled to condense and liquefy.

The refrigerant liquefied in the radiator 4 flows out from the radiator 4, and then flows through the refrigerant pipe 13E to reach the outdoor expansion valve 6. The refrigerant flowing into the outdoor expansion valve 6 is decompressed therein and then flows into the outdoor heat exchanger 7. The refrigerant flowing into the outdoor heat exchanger 7 evaporates, and the heat is pumped up from the outdoor air passed by running or the outdoor blower 15. That is, the refrigerant circuit R becomes a heat pump. Then, the low-temperature refrigerant flowing out from the outdoor heat exchanger 7 flows through the refrigerant pipe 13A and the solenoid valve 21 and the refrigerant pipe 13D, and flows from the refrigerant pipe 13C into the accumulator 12 to perform gas liquid separation therein, and then the gas refrigerant is sucked into the compressor 2, thereby repeating this circulation. The air heated in the radiator 4 flows through the heating medium-air heat exchanger 40 and is blown out from the outlet 29, thereby performing the heating of the vehicle interior.

The controller 32 calculates a radiator target pressure PCO (a target value of a pressure of the radiator 4) from a radiator target temperature TCO (a target value of a temperature of the radiator 4) calculated from the target outlet temperature TAO which will be described later, controls a number of revolution (NC) of the compressor 2 on the basis of the radiator target pressure PCO and a refrigerant pressure of the radiator 4 which is detected by the radiator pressure sensor 47 (the radiator pressure Pci, i.e., a high pressure of the refrigerant circuit R), also controls a valve position of the outdoor expansion valve 6 on the basis of a temperature (the radiator temperature TH) of the radiator 4 which is detected by the radiator temperature sensor 46 and the radiator pressure Pci which is detected by the radiator pressure sensor 47, and controls a subcool degree of the refrigerant in an outlet of the radiator 4. The radiator target temperature TCO basically has a relation of TCO=TAO, but a predetermined limit of controlling is provided.

(2) Flow of Refrigerant of Dehumidifying and Heating Mode

Next, in the dehumidifying and heating mode, the controller 32 opens the solenoid valve 22 in the above state of the heating mode. In consequence, a part of the condensed refrigerant flowing through the radiator 4 and the refrigerant pipe 13E is distributed, and flows through the solenoid valve 22 to flow from the refrigerant pipes 13F and 13B through the internal heat exchanger 19, thereby reaching the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by a heat absorbing operation at this time, and hence the air is cooled and dehumidified.

The refrigerant evaporated in the heat absorber 9 flows through the evaporation capability control valve 11 and the internal heat exchanger 19 to join the refrigerant from the refrigerant pipe 13D in the refrigerant pipe 13C, and then flows through the accumulator 12 to be sucked into the compressor 2, thereby repeating this circulation. The air dehumidified in the heat absorber 9 is reheated in a process of passing the radiator 4, thereby performing the dehumidifying and heating of the vehicle interior. The controller 32 controls the number (NC) of revolution of the compressor 2 on the basis of the radiator target pressure PCO calculated from the radiator target temperature TCO and the radiator pressure Pci (the high pressure of the refrigerant circuit R) detected by the radiator pressure sensor 47, and also controls the valve position of the outdoor expansion valve 6 on the basis of the temperature (the heat absorber temperature Te) of the heat absorber 9 which is detected by the heat absorber temperature sensor 48.

(3) Flow of Refrigerant of Internal Cycle Mode

Next, in the internal cycle mode, the controller 32 shuts off the outdoor expansion valve 6 in the above state of the dehumidifying and heating mode (a shut off position), and also closes the solenoid valve 21. When the outdoor expansion valve 6 and the solenoid valve 21 close (the solenoid valve 20 also closes), inflow of the refrigerant into the outdoor heat exchanger 7 and outflow of the refrigerant from the outdoor heat exchanger 7 are obstructed, and hence all the condensed refrigerant flowing through the radiator 4 and the refrigerant pipe 13E flows through the solenoid valve 22 to the refrigerant pipe 13F. Then, the refrigerant flowing through the refrigerant pipe 13F flows from the refrigerant pipe 13B through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19, the refrigerant pipe 13C and the accumulator 12 to be sucked into the compressor 2, thereby repeating this circulation. The air dehumidified in the heat absorber 9 is reheated in the process of passing the radiator 4, thereby performing the dehumidifying and heating of the vehicle interior, but in this internal cycle mode, the refrigerant circulates between the radiator 4 (heat radiation) and the heat absorber 9 (heat absorption) which are present in the air flow passage 3 on an indoor side, and hence the heat is not pumped up from the outdoor air, but a heating capability for a consumed power of the compressor 2 is exerted. The whole amount of the refrigerant flows through the heat absorber 9 which exerts a dehumidifying operation, and hence as compared with the above dehumidifying and heating mode, a dehumidifying capability is higher, but the heating capability lowers.

The controller 32 controls the number (NC) of revolution of the compressor 2 on the basis of the temperature of the heat absorber 9 or the radiator pressure Pci described above (the high pressure of the refrigerant circuit R). At this time, the controller 32 selects a smaller compressor target number of revolution from compressor target numbers of revolution obtainable by calculations from the temperature of the heat absorber 9 or the radiator pressure Pci, to control the compressor 2.

(4) Flow of Refrigerant of Dehumidifying and Cooling Mode

Next, in the dehumidifying and cooling mode, the controller 32 opens the solenoid valve 17 and closes the solenoid valve 21, the solenoid valve 22 and the solenoid valve 20. Then, the controller operates the compressor 2 and the respective blowers 15 and 27, and the air mix damper 28 has the state of passing the air blown out from the indoor blower 27 through the heating medium-air heat exchanger 40 and the radiator 4 as described later. In consequence, the high-temperature high-pressure gas refrigerant discharged from the compressor 2 flows into the radiator 4. Through the radiator 4, the air in the air flow passage 3 passes, and hence the air in the air flow passage 3 is heated by the high-temperature refrigerant in the radiator 4, whereas the refrigerant in the radiator 4 has the heat taken by the air and is cooled to condense and liquefy.

The refrigerant flowing out from the radiator 4 flows through the refrigerant pipe 13E to reach the outdoor expansion valve 6, and flows through the outdoor expansion valve 6 controlled so that the valve tends to be open, to flow into the outdoor heat exchanger 7. The refrigerant flowing into the outdoor heat exchanger 7 is cooled by the running therein or the outdoor air passed through the outdoor blower 15, to condense. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. The water in the air blown out from the indoor blower 27 coagulates to adhere to the heat absorber 9 by the heat absorbing operation at this time, and hence the air is cooled and dehumidified.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 is reheated in the process of passing the radiator 4 (a radiation capability is lower than that during the heating), thereby performing the dehumidifying and cooling of the vehicle interior. The controller 32 controls the number (NC) of revolution of the compressor 2 on the basis of the temperature (the heat absorber temperature Te) of the heat absorber 9 which is detected by the heat absorber temperature sensor 48, also controls the valve position of the outdoor expansion valve 6 on the basis of the above-mentioned high pressure of the refrigerant circuit R, and controls a refrigerant pressure of the radiator 4 (the radiator pressure Pci).

(5) Flow of Refrigerant of Cooling Mode

Next, in the cooling mode, the controller 32 opens the solenoid valve 20 in the above state of the dehumidifying and cooling mode (in this case, the outdoor expansion valve 6 may have any valve position including full open (the valve position is an upper limit of controlling)). It is to be noted that the air mix damper 28 has a state where the air does not pass through the heating medium-air heat exchanger 40 and the radiator 4 by such control as described later, but the air mix damper may have a state where the air slightly passes.

In consequence, the high-temperature high-pressure gas refrigerant discharged from the compressor 2 flows into the radiator 4. The air in the air flow passage 3 does not pass through the radiator 4, the refrigerant therefore only passes the radiator, and the refrigerant flowing out from the radiator 4 flows through the refrigerant pipe 13E to reach the solenoid valve 20 and the outdoor expansion valve 6. At this time, the solenoid valve 20 is open, and hence the refrigerant bypasses the outdoor expansion valve 6 to pass the bypass pipe 13J, and flows into the outdoor heat exchanger 7 as it is, in which the refrigerant is cooled by the running therein or the outdoor air passing through the outdoor blower 15, to condense and liquefy. The refrigerant flowing out from the outdoor heat exchanger 7 flows from the refrigerant pipe 13A through the solenoid valve 17 to successively flow into the receiver drier portion 14 and the subcooling portion 16. Here, the refrigerant is subcooled.

The refrigerant flowing out from the subcooling portion 16 of the outdoor heat exchanger 7 flows through the check valve 18 to enter the refrigerant pipe 13B, and flows through the internal heat exchanger 19 to reach the indoor expansion valve 8. The refrigerant is decompressed in the indoor expansion valve 8 and then flows into the heat absorber 9 to evaporate. Water in the air blown out from the indoor blower 27 coagulates to adhere to the heat absorber 9 by the heat absorbing operation at this time, and hence the air is cooled.

The refrigerant evaporated in the heat absorber 9 flows through the evaporation capability control valve 11, the internal heat exchanger 19 and the refrigerant pipe 13C to reach the accumulator 12, and flows therethrough to be sucked into the compressor 2, thereby repeating this circulation. The air cooled and dehumidified in the heat absorber 9 does not pass the radiator 4 (the air may slightly pass) but is blown out from the outlet 29 to the vehicle interior, thereby performing cooling of the vehicle interior. In this cooling mode, the controller 32 controls the number (NC) of revolution of the compressor 2 on the basis of the temperature (the heat absorber temperature Te) of the heat absorber 9 which is detected by the heat absorber temperature sensor 48.

(6) Changing of Operation Mode

In the auto mode, the controller 32 selects one of the above respective operation modes on the basis of the outdoor air temperature Tam detected by the outdoor air temperature sensor 33 and the target outlet temperature TAO on startup. Then, after the startup, the controller selects and changes each operation mode described above in accordance with changes of environments of the outdoor air temperature Tam, the target outlet temperature TAO and the like and setting conditions.

(7) Control of Air Mix Damper 28

Figure 3:
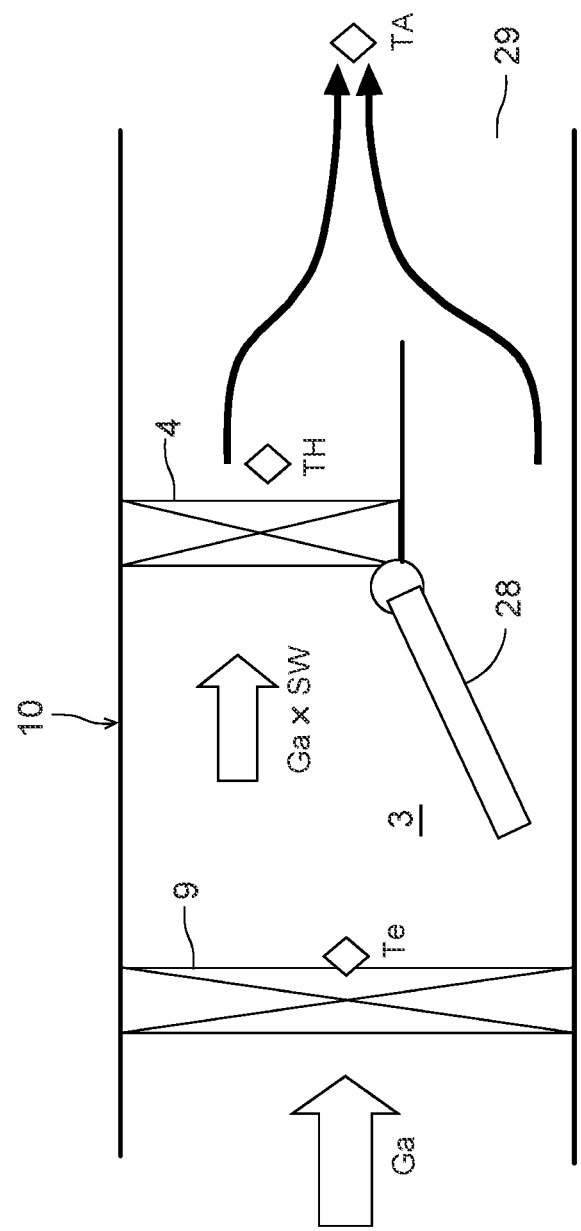
FIG. 3 is a schematic view of an air flow passage of the vehicle air conditioner device of FIG. 1 to explain an air volume ratio SW at which air is to be passed through a radiator.

Next, control of the air mix damper 28 by the controller 32 will be described with reference to FIG. 3 and FIG. 4. FIG. 3 is a schematic view of the air flow passage 3 to explain the air volume ratio SW at which the air is to be passed through the radiator 4. In this drawing, Ga is a mass air volume of air flowing into the air flow passage 3, Te is the above-mentioned temperature (the heat absorber temperature) of the heat absorber 9, TH is the above-mentioned temperature (the radiator temperature) of the radiator 4, and TA is the above-mentioned outlet temperature of the air actually blown out to the vehicle interior.

It is to be noted that in this drawing, to simplify the explanation, the heating medium-air heat exchanger 40 of the heating medium circulating circuit 23 mentioned above is omitted, but in actual, the heating medium-air heat exchanger 40 is present on the air upstream side of the radiator 4. Therefore, TH is the temperature of the air flowing through the heating medium-air heat exchanger 40 and the radiator 4 to be heated by these components.

Furthermore, as described above, the volume of the air to be passed through the radiator 4 is adjustable in an entire range from zero (all the air in the air flow passage 3) by the air mix damper 28. Therefore, the outlet temperature TA is prepared when the air heated by the radiator 4 joins the air which flows through the heat absorber 9, bypasses the radiator 4 and is not heated, in the air flowing through the heat absorber 9.

(7-1) Control of Air Mix Damper 28 in Cooling Mode and Dehumidifying and Cooling Mode In the above-mentioned cooling mode and dehumidifying and cooling mode, the controller 32 controls the air mix damper 28 to obtain the air volume ratio based on the air volume ratio SW at which the air is to be passed through the radiator 4 and which is calculated in accordance with the above-mentioned equation (Equation (I) mentioned below), thereby adjusting the volume of the air to be passed through the radiator 4. Furthermore, the outlet temperature TA in Equation (I) is represented in accordance with Equation (II) mentioned below.

$$SW=(TAO-Te)/(TH-Te) \quad (I)$$

$$TA=(TH-Te) \times SW+Te \quad (II)$$

It is to be noted that TAO is the target outlet temperature which is a target value of the temperature of the air from the outlet 29, and the controller 32 calculates the target outlet temperature on the basis of the outdoor air temperature Tam detected by the outdoor air temperature sensor 33, the temperature of the vehicle interior which is detected by the indoor air temperature sensor 37, a blower voltage (a voltage of the indoor blower 27), the solar radiation amount or the like detected by the solar radiation sensor 51, and a target interior temperature (a predetermined temperature) of the vehicle interior which is set by the air conditioning operating portion 53.

The air volume ratio SW at which the air is to be passed through the radiator 4 changes in a range of 0 SW 1, in which "0" indicates an air mix shut off state where the air is not passed through the radiator 4, and "1" indicates an air mix fully open state to pass all the air in the air flow passage 3 through the radiator 4. That is, the volume of the air to be passed through the radiator 4 is Ga×SW. In the cooling mode and the dehumidifying and cooling mode, the controller 32 controls the air mix damper 28 at the air volume ratio SW calculated in accordance with Equation (I) mentioned above, but in the cooling mode, the target outlet temperature TAO substantially becomes the heat absorber temperature Te, and hence SW comes close to "0", and the air mix damper 28 has the air mix shut off state where the air is not passed through the radiator 4 (and the heating medium-air heat exchanger 40).

(7-2) Control (No. 1) of Air Mix Damper 28 in Heating Mode and Dehumidifying and Heating Mode On the other hand, in the heating mode and the dehumidifying and heating mode (which include the internal cycle mode, and hereinafter, this will also apply), the controller 32 fixes the air volume ratio SW to "1" (the air mix fully open state) irrespective of Equation (I) mentioned above. Consequently, in the heating mode and the dehumidifying and heating mode, all the air in the air flow passage 3 passed through the heat absorber 9 is passed through the radiator 4.

Figure 4:
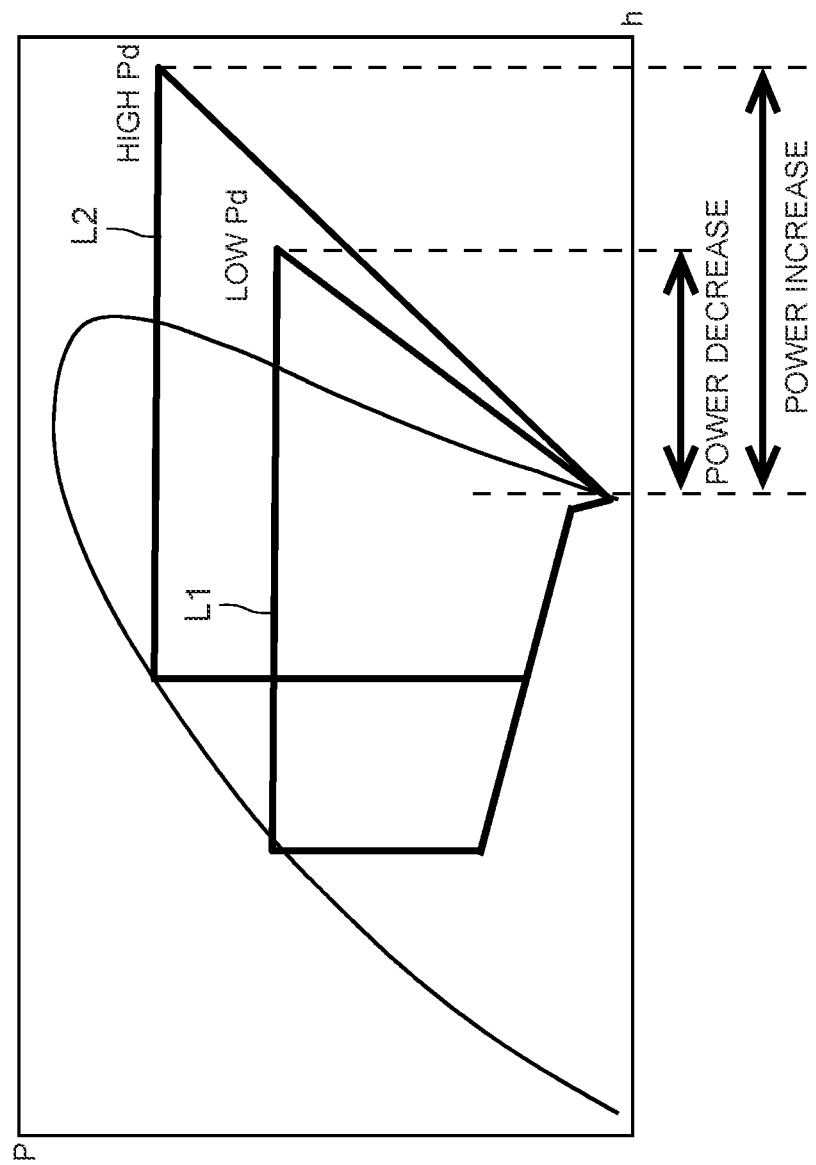
FIG. 4 is a p-h diagram of the vehicle air conditioner device of FIG. 1 when a heating capability of the radiator is the same and the air volume ratio SW is changed (Embodiment 1)

Here, FIG. 4 shows a p-h diagram of the refrigerant circuit R of the vehicle air conditioner device 1 when the heating capability (an air side capability) of the radiator 4 is the same and the air volume ratio SW is changed. In the drawing, L1 indicates the heating mode when SW is "1", L2 indicates the heating mode in a case where SW is smaller than "1", an upper side of each p-H diagram indicates the heating capability of the radiator 4 which is adjusted to be the same for use in comparison, and a right-side oblique side of each diagram indicates a power (a consumed power) of the compressor 2.

In a case where the air volume ratio SW is small, the volume (Ga×SW) of the air to be passed through the radiator 4 decreases. When the outlet temperature TA is the same, the air side capability of the radiator 4 is the same, but the air volume decreases, and hence for the purpose of preparing the same outlet temperature TA, the temperature and pressure of the radiator 4 also have to increase. Therefore, as compared with the case where the air volume ratio SW=1 (L1), it is seen that the discharge pressure Pd of the compressor 2 increases and that the power also increases (L2).

According to this embodiment, in the heating mode and the dehumidifying and heating mode, the controller 32 adjusts the air volume ratio SW into "1" to control the air mix damper 28, thereby passing all the air in the air flow passage 3 through the radiator 4, so that the power of the compressor 2 in the heating mode and the dehumidifying and heating mode is suppressed, thereby making it possible to achieve efficient vehicle interior heating. Furthermore, without reaching the air mix shut off state or its close state, the air to be passed through the radiator 4 is secured, so that a heat pump cycle does not break, and a stable heating/dehumidifying and heating operation can be achieved.

Embodiment 2

(7-3) Control (No. 2) of Air Mix Damper 28 in Heating Mode and Dehumidifying and Heating Mode Next, another embodiment of control of an air mix damper 28 in a heating mode and a dehumidifying and heating mode of a vehicle air conditioner device 1 of the present invention will be described with reference to FIG. 5 to FIG. 8.

Figure 5:
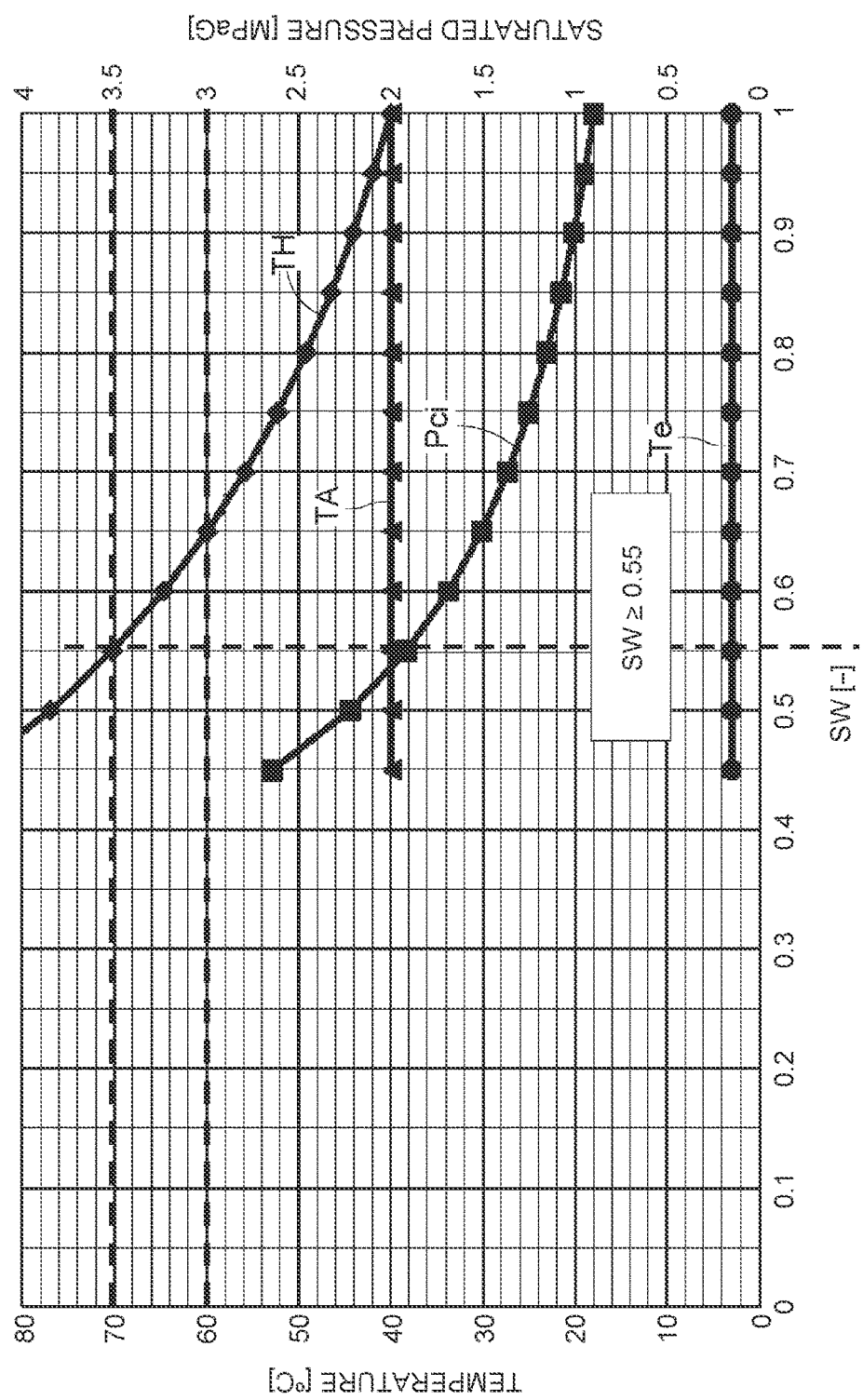
FIG. 5 is a diagram showing a behavior of each parameter of the vehicle air conditioner device of FIG. 1 when swinging an air volume ratio SW in a case where TAO is 40° C. (Embodiment 2)

FIG. 5 shows behaviors of a radiator temperature TH, a radiator pressure Pci, a heat absorber temperature Te and an outlet temperature TA when swinging an air volume ratio SW in a decreasing direction from "1" in a case where a target outlet temperature TAO is 40° C. in the heating mode. When decreasing, from 1, the air volume ratio SW to a radiator 4 (an air mix fully open state), the radiator temperature TH and the radiator pressure Pci increase. Now, when presuming that a limit value of the radiator pressure Pci (an upper limit value of a high pressure determined by characteristics of a refrigerant) is 2 MPaG and when SW is 0.55 or more, the radiator pressure Pci can be suppressed into this limit value of 2 MPaG or less.

Figure 6:
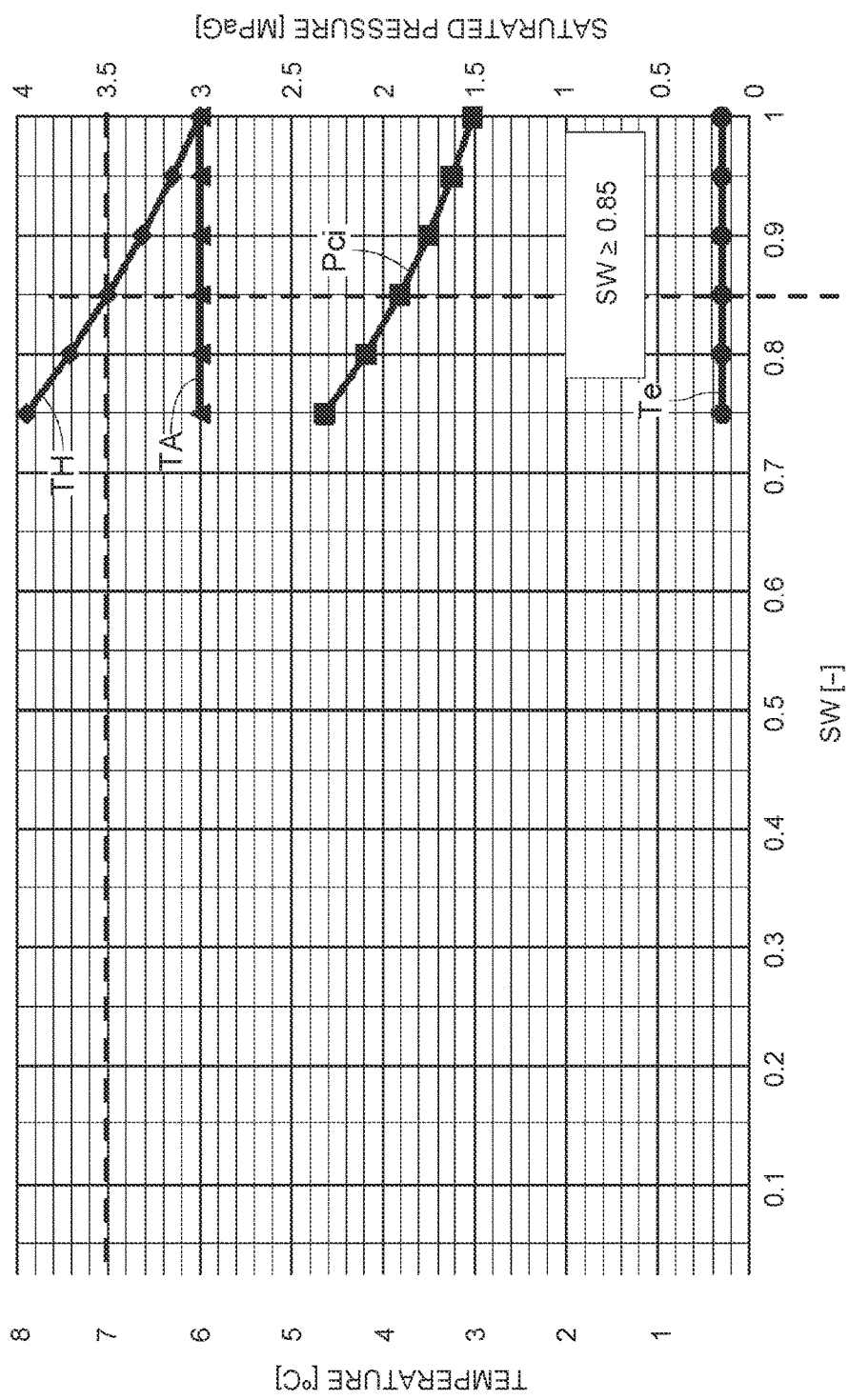
FIG. 6 is another diagram showing a behavior of each parameter of the vehicle air conditioner device of FIG. 1 when swinging the air volume ratio SW in a case where TAO is 60° C.

Furthermore, FIG. 6 similarly shows behaviors of the radiator temperature TH, the radiator pressure Pci, the heat absorber temperature Te and the outlet temperature TA when swinging the air volume ratio SW in the decreasing direction from "1" in a case where the target outlet temperature TAO is 60° C. in the heating mode. When similarly decreasing, from 1, the air volume ratio SW to the radiator 4, the radiator temperature TH and the radiator pressure Pci increase more rapidly than in the case of FIG. 5, but it is seen that when SW is 0.85 or more, the radiator pressure Pci can be suppressed into the limit value of 2 MPaG or less.

Figure 7:
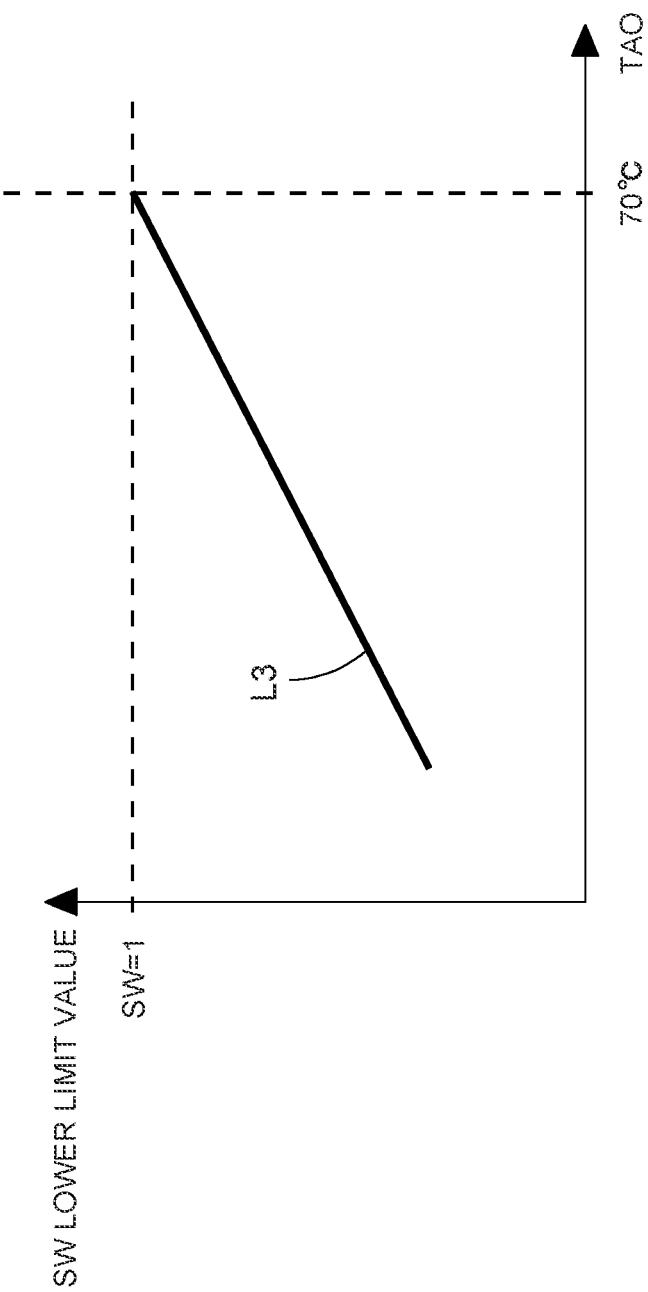
FIG. 7 is an explanatory view of a lower limit value of the air volume ratio SW which is determined from FIG. 5 and FIG. 6.

From the above, a lower limit value of SW when TAO=40° C. is set to 0.55 and a lower limit value of SW when TAO=60° C. is set to 0.85, and line L3 of FIG. 7 shows that these values are plotted in each target outlet temperature TAO (a maximum value of the target outlet temperature is set to TAO=70° C.)

Figure 8:
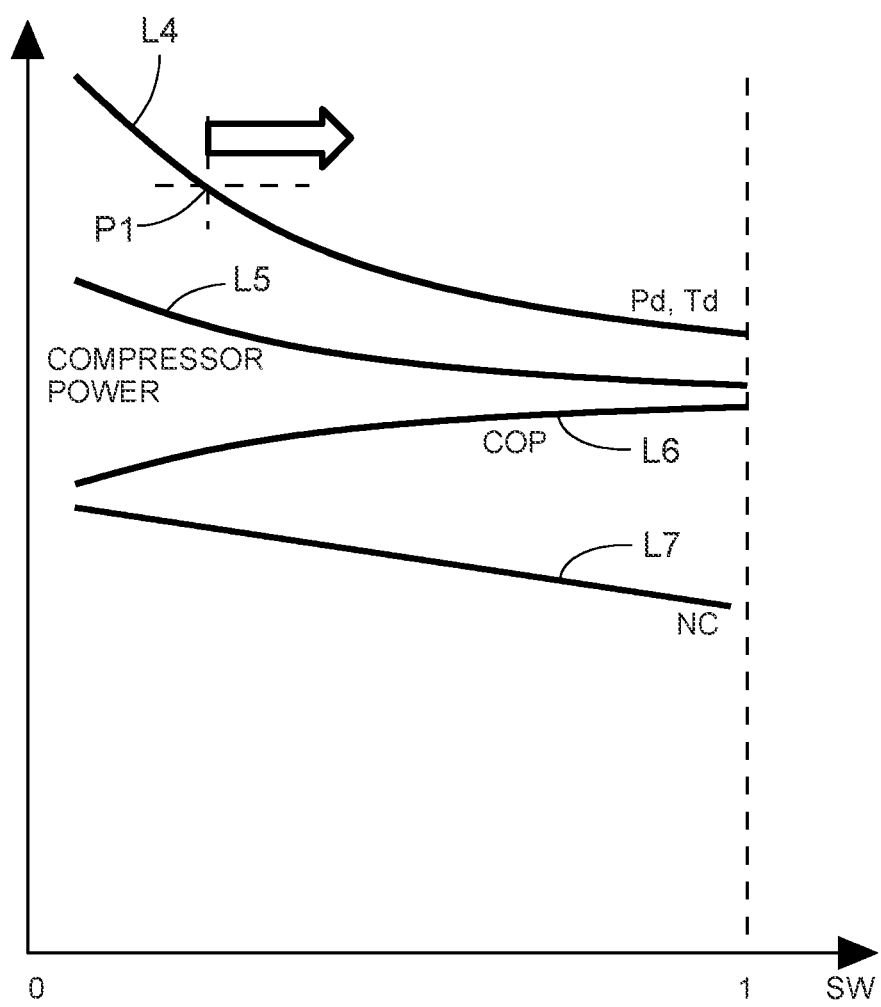
FIG. 8 is an explanatory view of changes of a compressor power, a discharge pressure and the like of the vehicle air conditioner device of FIG. 1 when the air volume ratio SW is changed.

Furthermore, FIG. 8 shows changes of a compressor discharge pressure Pd (L4), a compressor discharge temperature Td (L4), a power (L5) of a compressor 2, an efficiency COP (L6), and a compressor number of revolution NC (L7) in a case of changing the air volume ratio SW when the target outlet temperature TAO is the same. As apparent also from this drawing, when decreasing the air volume ratio SW from "1", it is seen that the compressor discharge pressure Pd, the discharge temperature Td, the power of the compressor 2 and the compressor number of revolution NC increase and that the efficiency COP decreases. It is to be noted that point P1 shown in FIG. 8 means a point on the line L3 of FIG. 7 in TAO.

In this embodiment, a controller 32 controls the air mix damper 28 on the basis of the air volume ratio SW calculated in accordance with Equation (I) mentioned above basically in all operation modes (the heating mode, the dehumidifying and heating mode, an internal cycle mode, a dehumidifying and cooling mode and a cooling mode), but in the heating mode and the dehumidifying and heating mode, the controller 32 regulates SW so that SW is on the line L3 or above the line L3 of FIG. 7 (on the point P1 or on the right side of the point in FIG. 8). That is, in a case where the air volume ratio SW calculated in accordance with Equation (I) in each target outlet temperature TAO is the line L3 or more, the controller employs the SW, and in a case where the ratio is below the line L3, the controller 32 increases SW up to the line L3 irrespective of the calculation result of Equation (I).

For example, in a case where the target outlet temperature TAO rapidly decreases due to rapid weather change or a manual operation in a situation of executing the heating mode, there is the possibility that the air volume ratio SW to the radiator 4 which is calculated in accordance with Equation (I) also transiently and rapidly decreases. Therefore, when employing the calculated air volume ratio SW as it is and closing the air mix damper 28, there is the risk that SW decreases below the lower limit value as shown in FIG. 5 and FIG. 6 and that the radiator pressure Pci is in excess of the limit value.

However, in this embodiment, the controller 32 regulates the air volume ratio SW at which the air in the air flow passage 3 is to be passed through the radiator 4, into the lower limit value shown by the line L3 of FIG. 7 or more in the heating mode and the dehumidifying and heating mode, and hence the increase of the discharge pressure Pd of the compressor 2 in the heating mode and the dehumidifying and heating mode is suppressed into its limit value or less, thereby making it possible to achieve improvement of a durability. Furthermore, such regulation is provided, and hence without reaching the air mix damper shut off state or a close state, the air to be passed through the radiator 4 is acquired, so that the heat pump cycle does not break, and a stable heating/dehumidifying and heating operation can be achieved.

Embodiment 3

(8) Control (No. 3) of Air Mix Damper 28 in B/L Blowout Mode

A controller 32 has a B/L blowout mode to blow out air from both a vent and a foot to a vehicle interior by an outlet changing damper 31. Furthermore, this B/L blowout mode is executed by the controller 32 in the above-mentioned auto mode or selected in a manual mode.

The above vent blows out toward a passenger's breast, and it is usually considered that an outlet temperature is preferably about 25° C. (lower than a body temperature) from a viewpoint of comfort, and an outlet temperature of the above foot is preferably about 40° C. (the body temperature or higher) for the same reason. That is, it is preferable that there is a difference of about 15 degrees between both the temperatures.

Figure 9:
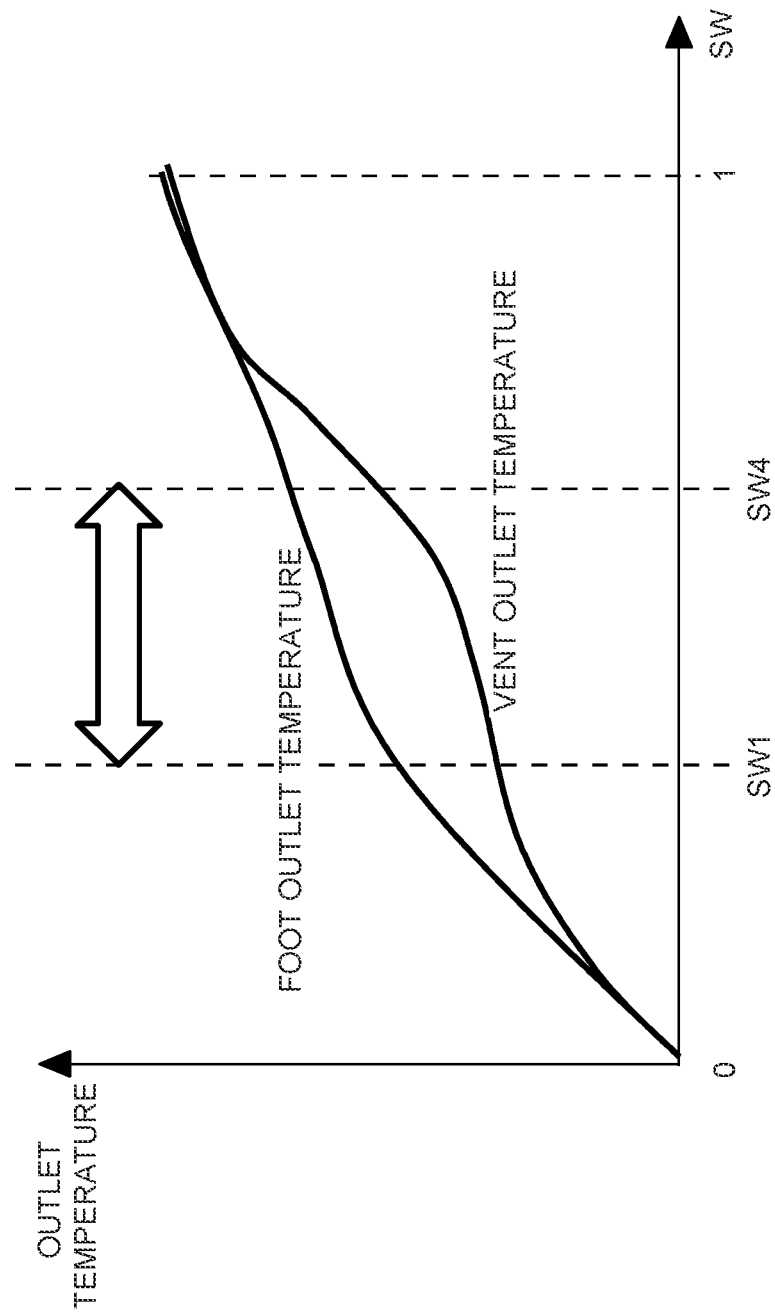
FIG. 9 is an explanatory view of regulation of the air volume ratio SW of the vehicle air conditioner device of FIG. 1 in a B/L blowout mode (Embodiment 3)

On the other hand, although depending on characteristics of an HVAC unit 10, there is limited a range of an air volume ratio SW at which a difference in outlet temperature between the vent and the foot in this B/L blowout mode can sufficiently be made. FIG. 9 shows changes of the respective outlet temperatures of the vent and the foot when changing the air volume ratio SW between "1" and "0". As apparent also from this drawing, the temperature difference can be taken in an intermediate range between air volume ratios SW1 and SW4 (SW1<SW4). This is because the temperature of the air blown out from each outlet becomes almost the same even when the air volume ratio SW is excessively large or small.

Thus, while the controller 32 controls the air mix damper 28 as in each of the above-mentioned embodiments, the controller forcibly regulates the air volume ratio SW to a radiator 4 in the intermediate range between SW1 and SW4 in a case where a blowout mode is the B/L blowout mode of the auto mode in this embodiment. Consequently, the sufficient difference can be taken in outlet temperature between the vent and the foot, and it is possible to secure conformity.

Embodiment 4

(9) Control (No. 4) of Air Mix Damper 28 in Case of Vehicle in which Target Outlet Temperatures are Independently Settable at Driver's Seat and Assistant Driver's Seat (Right/Left Independent Control)

Next, control of an air mix damper 28 in a case where target outlet temperatures are independently settable at a driver's seat (Dr) and an assistant driver's seat (As) in a vehicle will be described with reference to FIG. 10. In this case, in an air conditioning operating portion 53, a target outlet temperature TAODr (for the driver's seat) and a target outlet temperature TAOAs (for the assistant driver's seat) are independently settable at the driver's seat and the assistant driver's seat, air mix dampers 28 and outlet changing dampers 31 are disposed for the driver's seat and the assistant driver's seat, respectively, and air volume ratios SW to a radiator 4 are also adjustable into SWDr for the driver's seat and SWAs for the assistant driver's seat, respectively.

First, in any operation mode, a controller 32 controls the respective air mix dampers 28 for the driver's seat and the assistant driver's seat to obtain air volumes of the respective ratios SWDr and SWAs (which change in a range of 0≤SWDr/SWAs≤1), on the basis of air volume ratios at which the air is to be passed through the radiator 4 and which are calculated in accordance with Equation (I-I) mentioned below of the air volume ratio SWDr for the driver's seat and Equation (I-II) mentioned below of the air volume ratio SWAs for the assistant driver's seat in the same manner as in Equation (I) mentioned above.

$$SWDr=(TAODr-Te)/(TH-Te) \quad \text{(I-I)}$$

$$SWAs=(TAOAs-Te)/(TH-Te) \quad \text{(I-II)}$$

Additionally, in a heating mode, a dehumidifying and heating mode and the B/L blowout mode in each operation mode of the auto mode (Auto), limits are added to the respective air volume ratios SWDr and SWAs in accordance with conditions as described later.

Furthermore, in any operation mode, the controller 32 sets a radiator target temperature TCO to a higher value in the target outlet temperature TAODr and the target outlet temperature TAOAs (TCO=MAX(TAODr, TAOAs)). Additionally, the controller fixes the radiator target temperature TCO to an upper limit value in the above-mentioned B/L blowout mode of the auto mode.

(9-1) Control in Mode Other than B/L Blowout Mode of Auto Mode

That is, in a case where the target outlet temperature TAODr of the driver's seat and the target outlet temperature TAOAs of the assistant driver's seat are the same (TAODr=TAOAs) in the heating mode and the dehumidifying and heating mode, the controller 32 determines the radiator target temperature TCO in accordance with, for example, the target outlet temperature TAODr of the driver's seat (which may be the target outlet temperature TAOAs of the assistant driver's seat). Furthermore, irrespective of Equations (I-I) and (I-II) mentioned above, the controller sets the air volume ratio SWDr for the driver's seat to "1", and also sets the air volume ratio SWAs for the assistant driver's seat to "1" to control the respective air mix dampers 28 for the driver's seat and the assistant driver's seat. Consequently, it is possible to produce effects similar to those of Embodiment 1 described above at both the driver's seat and the assistant driver's seat.

Next, in a case where the target outlet temperature TAODr of the driver's seat is higher than the target outlet temperature TAOAs of the assistant driver's seat (TAODr>TAOAs) in the heating mode and the dehumidifying and heating mode, the controller 32 determines the radiator target temperature TCO in accordance with the target outlet temperature TAODr of the driver's seat. Then, the controller sets the air volume ratio SWDr for the driver's seat to "1" irrespective of Equation (I-I) mentioned above, and calculates the air volume ratio SWAs for the assistant driver's seat in accordance with Equation (I-II) mentioned above, i.e., SWAs=(TAOAs−Te)/(TH−Te), to control the respective air mix dampers 28 for the driver's seat and the assistant driver's seat.

Furthermore, the controller regulates the air volume ratio SWAs of the assistant driver's seat into a lower limit value or more of Embodiment 2 described above (the lower limit value≤SWAs≤1). Consequently, it is possible to produce effects similar to those of Embodiment 1 described above at the driver's seat and it is possible to produce effects similar to those of Embodiment 2 described above at the assistant driver's seat.

Next, in a case where the target outlet temperature TAODr of the driver's seat is lower than the target outlet temperature TAOAs of the assistant driver's seat (TAODr<TAOAs) in the heating mode and the dehumidifying and heating mode, the controller 32 determines the radiator target temperature TCO in accordance with the target outlet temperature TAOAs of the assistant driver's seat. Then, the controller sets the air volume ratio SWAs for the assistant driver's seat to "1" irrespective of Equation (I-II) mentioned above, and calculates the air volume ratio SWDr for the driver's seat in accordance with Equation (I-I) mentioned above, i.e., SWDr=(TAODr−Te)/(TH−Te), to control the respective air mix dampers 28 for the driver's seat and the assistant driver's seat.

Furthermore, the controller regulates the air volume ratio SWDr of the driver's seat into a lower limit value or more of Embodiment 2 described above (the lower limit value SWDr 1). Consequently, it is possible to produce effects similar to those of Embodiment 1 described above at the assistant driver's seat and it is possible to produce effects similar to those of Embodiment 2 described above at the driver's seat.

Next, in a case where the target outlet temperature TAODr of the driver's seat and the target outlet temperature TAOAs of the assistant driver's seat are the same (TAODr=TAOAs) in a dehumidifying and cooling mode and a cooling mode, the controller 32 determines the radiator target temperature TCO in accordance with, for example, the target outlet temperature TAODr of the driver's seat (which may be the target outlet temperature TAOAs for the assistant driver's seat), calculates the air volume ratio SWDr for the driver's seat in accordance with Equation (I-I) mentioned above, i.e., SWDr=(TAODr−Te)/(TH−Te), and also calculates the air volume ratio SWAs for the assistant driver's seat in accordance with Equation (I-II), i.e., SWAs=(TAOAs−Te)/(TH−Te) to control the respective air mix dampers 28 for the driver's seat and the assistant driver's seat.

On the other hand, in a case where the target outlet temperature TAODr of the driver's seat is higher than the target outlet temperature TAOAs of the assistant driver's seat (TAODr>TAOAs), the controller 32 determines the radiator target temperature TCO in accordance with the target outlet temperature TAODr of the driver's seat. Conversely, in a case where the target outlet temperature TAODr of the driver's seat is lower than the target outlet temperature TAOAs of the assistant driver's seat (TAODr<TAOAs), the controller 32 determines the radiator target temperature TCO in accordance with the target outlet temperature TAOAs of the assistant driver's seat. The control of the respective air mix dampers 28 is performed in the same manner as described above.

(9-2) Control in B/L Blowout Mode of Auto Mode

On the other hand, in a case of the B/L blowout mode of the auto mode, the controller 32 fixes the radiator target temperature TCO to an upper limit value as described above. Next, in a case where the target outlet temperature TAODr of the driver's seat and the target outlet temperature TAOAs of the assistant driver's seat are the same (TAODr=TAOAs) in all the operation modes, the controller 32 regulates the air volume ratio SWDr for the driver's seat and the air volume ratio SWAs for the assistant driver's seat which are calculated in accordance with Equations (I-I) and (I-II) mentioned above in an intermediate range of a predetermined value SW2 or more to SW3 or less to control the respective air mix dampers 28 for the driver's seat and the assistant driver's seat.

In this case, it is considered that the respective air volume ratios have a relation of SW1<SW2<SW3<SW4. That is, the intermediate range of SW2 or more to SW3 or less is a range included in the above-mentioned intermediate range of SW1 or more to SW4 or less of Embodiment 3 described above. Consequently, it is possible to produce effects similar to those of Embodiment 3 described above at both the driver's seat and the assistant driver's seat.

Next, in a case where the target outlet temperature TAODr of the driver's seat is higher than the target outlet temperature TAOAs of the assistant driver's seat (TAODr>TAOAs) in all the operation modes, the controller 32 regulates the air volume ratio SWDr for the driver's seat which is calculated in accordance with Equation (I-I) mentioned above into a first intermediate range of SW3 or more to SW4 or less, and regulates the air volume ratio SWAs for the assistant driver's seat which is calculated in accordance with Equation (I-II) mentioned above into a second intermediate range of SW1 or more to SW2 or less, to control the respective air mix dampers 28 for the driver's seat and the assistant driver's seat.

The second intermediate range of SW1 or more to SW2 or less is a range lower than the first intermediate range of SW3 or more to SW4 or less. Consequently, in the case where the target outlet temperature TAODr of the driver's seat is higher than the target outlet temperature TAOAs of the assistant driver's seat, it is possible to smoothly achieve effects similar to those of Embodiment 3 at the driver's seat and the assistant driver's seat, respectively.

Next, in a case where the target outlet temperature TAODr of the driver's seat is lower than the target outlet temperature TAOAs of the assistant driver's seat (TAODr<TAOAs) in all the operation modes, the controller 32 regulates the air volume ratio SWDr for the driver's seat which is calculated in accordance with Equation (I-I) mentioned above into the second intermediate range of SW1 or more to SW2 or less, and regulates the air volume ratio SWAs for the assistant driver's seat which is calculated in accordance with Equation (I-II) mentioned above into the first intermediate range of SW3 or more to SW4 or less, to control the respective air mix dampers 28 for the driver's seat and the assistant driver's seat. Consequently, in the case where the target outlet temperature TAODr of the driver's seat is lower than the target outlet temperature TAOAs of the assistant driver's seat, it is possible to smoothly achieve effects similar to those of Embodiment 3 at the driver's seat and the assistant driver's seat, respectively.

When the target outlet temperatures TAODr and TAOAs at the driver's seat and the assistant driver's seat are settable as described above, the controller 32 sets the radiator target temperature TCO of the radiator 4 to a higher target outlet temperature at the driver's seat and the assistant driver's seat, and also controls the respective air mix dampers 28 on the basis of the air volume ratios SWDr and SWAs calculated in accordance with Equations (I-I) and (I-II) in the cooling mode and the dehumidifying and cooling mode to adjust the ratio at which the air is to be passed through the radiator 4. In the heating mode and the dehumidifying and heating mode, the controller controls the air mix damper 28 having the higher target outlet temperature at the driver's seat and the assistant driver's seat to pass all the air in the air flow passage 3 through the radiator 4, and controls the air mix damper 28 having a lower target outlet temperature to pass the air through the radiator 4 at the air volume ratio calculated in accordance with Equation (I-I) or Equation (I-II) and to regulate the ratio into the predetermined lower limit value or more. Therefore, while achieving efficient vehicle interior heating at the higher target outlet temperature in the heating mode and the dehumidifying and heating mode, the increase of the discharge pressure of the compressor 2 is inhibited at the lower target outlet temperature, and it is possible to achieve improvement of a durability. Furthermore, a heat pump cycle does not break and a stable heating operation can be achieved in the same manner as in the above-mentioned embodiments.

Furthermore, in the B/L blowout mode of the auto mode, the controller controls the air mix damper 28 having the higher target outlet temperature to regulate the ratio at which the air in the air flow passage 3 is to be passed through the radiator 4 and which is calculated in accordance with Equation (I-I) or (I-II) into the predetermined first intermediate range, and also controls the air mix damper 28 having the lower target outlet temperature to regulate the ratio at which the air in the air flow passage 3 is to be passed through the radiator 4 into the predetermined second intermediate range smaller than the first intermediate range, so that an appropriate difference can be made in outlet temperature between a vent and a foot at each of the driver's seat and the assistant driver's seat, and it is possible to secure conformity at each seat.

It is to be noted that in the embodiments, there has been described the example to control the air mix damper 28 on the basis of the air volume ratio SW (SWDr or SWAs) calculated in accordance with Equation (I) or the like, but there is a constant relation between a position of the air mix damper 28 and the volume of the air to be passed through the radiator 4, and hence the controller may control this position of the air mix damper 28 (an air mix damper position) on the basis of the target outlet temperature TAO, the radiator temperature TH, the heat absorber temperature Te and the like. According to the concept of the present invention, the adjustment of the air volume ratio to the radiator 4 also includes adjustment of the air mix damper position.

Furthermore, in the embodiments, the controller controls the air mix damper 28 on the basis of the air volume ratio SW (SWDr or SWAs) calculated in accordance with Equation (I) or the like which has heretofore been usual, but the present invention is not limited to the embodiments, and the present invention is also effective for a case of calculating the ratio at which the air is to be passed through the radiator 4 on the basis of one or any combination of the target outlet temperature TAO, the radiator temperature TH and the heat absorber temperature Te and controlling the air mix damper 28.

On the other hand, in the embodiments, the present invention is applied to the vehicle air conditioner device 1 which changes and executes the respective operation modes of the heating mode, the dehumidifying and heating mode, the internal cycle mode, the dehumidifying and cooling mode and the cooling mode, but the present invention is not limited to the embodiments, and the present invention is also effective in performing only the heating mode and the cooling mode, or any combination of these modes, the dehumidifying and heating mode and the dehumidifying and cooling mode.

Furthermore, the constitution of the refrigerant circuit R which has been described above in each embodiment is not limited to the embodiment, and needless to say, the constitution is changeable without departing from the gist of the present invention.

DESCRIPTION OF REFERENCE NUMERALS 1 vehicle air conditioner device
2 compressor
3 air flow passage
4 radiator
6 outdoor expansion valve
7 outdoor heat exchanger
8 indoor expansion valve
9 heat absorber
26 suction changing damper
27 indoor blower (blower fan)
28 air mix damper
31 outlet changing damper
32 controller (control means)
R refrigerant circuit

The invention claimed is:
1. A vehicle air conditioner device comprising:
a compressor which compresses a refrigerant;
an air flow passage through which air to be supplied to a vehicle interior flows;
a radiator which lets the refrigerant radiate heat to heat the air to be supplied from the air flow passage to the vehicle interior;
a heat absorber which lets the refrigerant absorb heat to cool the air to be supplied from the air flow passage to the vehicle interior;
an outdoor heat exchanger disposed outside the vehicle interior to let the refrigerant radiate or absorb heat;
an air mix damper to adjust a ratio at which the air in the air flow passage passed through the heat absorber is to be passed through the radiator; and
control means,
the vehicle air conditioner device changing and executing at least a heating mode in which the control means lets the refrigerant discharged from the compressor radiate heat in the radiator, decompresses the refrigerant by which heat has been radiated, and then lets the refrigerant absorb heat in the outdoor heat exchanger, and a cooling mode in which the control means lets the refrigerant discharged from the compressor radiate heat in the outdoor heat exchanger, decompresses the refrigerant by which heat has been radiated, and then lets the refrigerant absorb heat in the heat absorber, wherein the air mix dampers are disposed to a driver's seat and an assistant driver's seat, respectively, the control means is settable target outlet temperatures at the driver's seat and the assistant driver's seat, respectively, and adjusts a radiator target temperature of the radiator into a higher target outlet temperature in the target outlet temperatures at the driver's seat and the assistant driver's seat, and in the cooling mode, the control means controls the air mix dampers to adjust the ratio at which the air is to be passed through the radiator on the basis of one, any combination, or all of a target outlet temperature, a temperature of the radiator and a temperature of the heat absorber, and in the heating mode, the control means controls the air mix damper having the higher target outlet temperature in the air mix dampers at the driver's seat and the assistant driver's seat to pass all the air in the air flow passage through the radiator, and the control means controls the air mix damper having the lower target outlet temperature to adjust the ratio at which the air is to be passed through the radiator and to regulate the ratio into a predetermined lower limit value or more, on the basis of one, any combination, or all of the target outlet temperature, the temperature of the radiator and the temperature of the heat absorber.

2. The vehicle air conditioner device according to claim 1, which executes a dehumidifying and heating mode in which the control means lets the refrigerant discharged from the compressor radiate heat in the radiator, decompresses the refrigerant by which heat has been radiated, and then lets the refrigerant absorb heat in the heat absorber and the outdoor heat exchanger, wherein also in the dehumidifying and heating mode, the control means controls the air mix damper having the higher target outlet temperature in the air mix dampers at the driver's seat and the assistant driver's seat to pass all the air in the air flow passage through the radiator, and the control means controls the air mix damper having the lower target outlet temperature to adjust the ratio at which the air is to be passed through the radiator and to regulate the ratio into a predetermined lower limit value or more, on the basis of one, any combination, or all of the target outlet temperature, the temperature of the radiator and the temperature of the heat absorber.

3. The vehicle air conditioner device according to claim 1, wherein the control means has a B/L blowout mode to blow out air from both a vent and a foot to the vehicle interior, and in the B/L blowout mode, the control means controls the air mix damper having the higher target outlet temperature to regulate the ratio at which the air in the air flow passage is to be passed through the radiator in a predetermined first intermediate range, and the control means controls the air mix damper having the lower target outlet temperature to regulate the ratio at which the air in the air flow passage is to be passed through the radiator in a predetermined second intermediate range smaller than the first intermediate range.

* * * * *